United States Patent
Cai et al.

(10) Patent No.: US 11,496,935 B2
(45) Date of Patent: Nov. 8, 2022

(54) CELL MEASUREMENT METHOD AND TERMINAL DEVICE

(71) Applicant: HUAWEI TECHNOLOGIES CO., LTD., Guangdong (CN)

(72) Inventors: Yu Cai, Beijing (CN); Yanzhao He, Beijing (CN); Jian Wang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 45 days.

(21) Appl. No.: 16/973,357

(22) PCT Filed: Apr. 25, 2019

(86) PCT No.: PCT/CN2019/084263
§ 371 (c)(1),
(2) Date: Dec. 8, 2020

(87) PCT Pub. No.: WO2019/237839
PCT Pub. Date: Dec. 19, 2019

(65) Prior Publication Data
US 2021/0258841 A1    Aug. 19, 2021

(30) Foreign Application Priority Data
Jun. 15, 2018    (CN) .......................... 201810623955.0

(51) Int. Cl.
*G08C 17/00* (2006.01)
*H04W 36/00* (2009.01)
(Continued)

(52) U.S. Cl.
CPC ...... *H04W 36/0094* (2013.01); *H04B 17/318* (2015.01); *H04W 36/30* (2013.01); *H04W 36/32* (2013.01)

(58) Field of Classification Search
CPC . H04W 36/0094; H04W 36/30; H04W 36/32; H04W 36/0083; H04W 24/10; H04W 24/02; H04W 36/08; H04B 17/318
(Continued)

(56) References Cited

U.S. PATENT DOCUMENTS 9,220,028 B2 * 12/2015 Suzuki ................. H04W 24/10
9,986,494 B2 *  5/2018 Wang .................... H04L 5/006
(Continued)

FOREIGN PATENT DOCUMENTS

CN    102143505 A    8/2011
CN    102917380 A    2/2013
(Continued)

OTHER PUBLICATIONS

Qualcomm Incorporated .,"Discussion on open issues in WUS ARM in NB-IoT",3GPP TSG-RAN WG4 Meeting #87 Busan, s uth k rea, May 21-25, 2018,R4-1806864,total 3pages.
(Continued)

*Primary Examiner* — Amancio Gonzalez
(74) *Attorney, Agent, or Firm* — Womble Bond Dickinson (US) LLP

(57) ABSTRACT

This application provides a cell measurement method and terminal device. The cell measurement method includes: first determining, by a terminal device, whether a cell meets a first preset condition; and when the terminal device determines that the cell meets the first preset condition, measuring or evaluating, by the terminal device, the cell by using a first period; or when the terminal device determines that the cell does not meet the first preset condition, measuring or evaluating, by the terminal device, the cell by using a second period, where the cell being a serving cell or a neighboring cell of the terminal device corresponds to
(Continued)

different first preset conditions, and the first period is different from the second period.

20 Claims, 3 Drawing Sheets

(51) Int. Cl.
*H04B 17/318* (2015.01)
*H04W 36/30* (2009.01)
*H04W 36/32* (2009.01)

(58) Field of Classification Search
USPC .......................................................... 370/311
See application file for complete search history.

(56) References Cited

U.S. PATENT DOCUMENTS

| | | | | |
|---|---|---|---|---|
| 10,165,473 | B2* | 12/2018 | Marwah | H04W 36/0058 |
| 10,405,267 | B2* | 9/2019 | Marinier | H04W 48/16 |
| 10,959,118 | B2* | 3/2021 | Kim | H04W 24/08 |
| 11,128,510 | B2* | 9/2021 | Ren | H04W 72/044 |
| 2007/0232278 | A1* | 10/2007 | May | H04M 1/72451 |
| | | | | 455/566 |
| 2012/0307665 | A1 | 12/2012 | Cardineau et al. | |
| 2015/0195735 | A1 | 7/2015 | Deng et al. | |
| 2015/0350976 | A1 | 12/2015 | Kodali et al. | |
| 2020/0137606 | A1* | 4/2020 | Jiang | H04W 24/10 |

FOREIGN PATENT DOCUMENTS

| | | |
|---|---|---|
| CN | 105636106 A | 6/2016 |
| CN | 105898777 A | 8/2016 |
| WO | 2017077463 A1 | 5/2017 |
| WO | 2017123009 A1 | 7/2017 |

OTHER PUBLICATIONS

3GPP TS 38.133 V15.2.0 (Jun. 2018), 3rd Generation Partnership Project; Technical Specification Group Radio Access Network; NR; Requirements for support of radio resource management(Release 15), 79 pages.

3GPP TS 38.304 V15.0.0 (Jun. 2018);3rd Generation Partnership Project;Technical Specification Group Radio Access Network;NR;User Equipment (UE) procedures in Idle mode and RRC Inactive state(Release 15);total 25 pages.

3GPP TS 36.304 V15.0.0 (Jun. 2018),3rd Generation Partnership Project;Technical Specification Group Radio Access Network;Evolved Universal Terrestrial Radio Access (E-UTRA); User Equipment (UE) procedures in idle mode Release 11),total 52 pages.

3GPP TS 36.133 V15.3.0 (Jun. 2018) ,3rd Generation Partnership Project;Technical Specification Group Radio Access Network;Evolved Universal Terrestrial Radio Access (E-UTRA);Requirements for support of radio resource management(Release 12),,dated Mar. 2015,total 2945 pages.

* cited by examiner

CELL MEASUREMENT METHOD AND TERMINAL DEVICE

CROSS-REFERENCE TO RELATED APPLICATIONS

This application is a National Stage of International Application No. PCT/CN2019/084263, filed on Apr. 25, 2019, which claims priority to Chinese Patent Application No. 201810623955.0, filed on Jun. 15, 2018, both of which are hereby incorporated by reference in their entireties.

TECHNICAL FIELD

This application relates to the communications field, and more specifically, to a cell measurement method and terminal device.

BACKGROUND

In a long term evolution (LTE) system, after being powered on, a terminal device first selects a public land mobile network (PLMN). Once the terminal device selects one PLMN, the terminal device selects, according to a cell selection criterion, an appropriate cell belonging to the PLMN to camp on. When the terminal device camps on one cell, the terminal device periodically searches for a cell to select a better cell according to a cell reselection criterion to camp on. A cell on which the terminal device camps is a serving cell of the terminal device. When the terminal device camps on one cell, the terminal device measures or evaluates the serving cell and a neighboring cell.

Currently, a known method for measuring or evaluating the cell by the terminal device is that the terminal device measures and evaluates the serving cell or the neighboring cell of the terminal device by using a discontinuous reception (DRX) cycle. The terminal device does not flexibly configure a period for measuring or evaluating the serving cell or the neighboring cell based on an actual situation of the serving cell or the neighboring cell. Therefore, how to flexibly select, based on different situations of the serving cell or the neighboring cell, a period for measuring or evaluating the serving cell or the neighboring cell becomes an urgent problem to be resolved.

SUMMARY

This application provides a cell measurement method and terminal device, so that the terminal device can flexibly select, based on different situations of a serving cell or a neighboring cell of the terminal device, a period for measuring or evaluating the serving cell or the neighboring cell.

According to a first aspect, a cell measurement method is provided, including: if a terminal device determines that a cell meets a first preset condition, using, by the terminal device, a first period as a period for measuring or evaluating the cell; or if the terminal device determines that a cell does not meet the first preset condition, using, by the terminal device, a second period as a period for measuring or evaluating the cell.

The first period is not equal to the second period. In some embodiments, the first period may be greater than the second period.

In an embodiment, the cell is a serving cell of the terminal device, and the first preset condition includes at least one of a measurement quantity of the cell meets a second preset condition, the terminal device does not measure a neighboring cell, the cell meets a cell selection criterion, and the cell meets a cell reselection criterion; or the cell is a neighboring cell of the terminal device, and the first preset condition includes at least one of a measurement quantity of the cell meets a third preset condition, the cell does not meet a cell selection criterion, and the cell does not meet a cell reselection criterion.

According to the cell measurement method provided in this embodiment of this application, the terminal device determines different measurement or evaluation periods based on whether the serving cell or the neighboring cell of the terminal device meets the first preset condition. Therefore, the period for measuring or evaluating the serving cell or the neighboring cell of the terminal device can be flexibly configured based on different situations of the serving cell or the neighboring cell of the terminal device. In addition, according to the cell measurement method provided in this embodiment of this application, different first preset conditions are preset based on a relationship between the cell and the terminal device. When the cell is the serving cell of the terminal device, the first preset condition may be the serving cell meets the cell selection criterion, the serving cell meets the cell reselection criterion, the terminal device does not measure the neighboring cell, or the measurement quantity of the serving cell meets the second preset condition; or when the cell is the neighboring cell of the terminal device, the first preset condition may be the neighboring cell does not meet the cell selection criterion, the neighboring cell does not meet the cell reselection criterion, or the measurement quantity of the neighboring cell meets the third preset condition.

Optionally, the first preset condition may be predefined.

It should be understood that the terminal device does not measure the neighboring cell may be that the terminal device does not trigger measuring the neighboring cell.

Optionally, that the terminal device does not measure the neighboring cell is specifically that the terminal device does not measure a low-priority neighboring cell.

Optionally, the measuring the neighboring cell is measuring an intra-frequency neighboring cell. Optionally, the measuring the neighboring cell is measuring an inter-frequency neighboring cell.

Optionally, the terminal device may determine, based on the measurement quantity of the serving cell, whether to measure the neighboring cell.

It should be understood that when the serving cell meets any one or more of the first preset conditions, it indicates that signal quality of the serving cell is comparatively good, and there is a low probability that the terminal device reselects a cell. Further, the terminal device can reduce a frequency of measuring or evaluating the serving cell, to reduce power consumption of the terminal device.

It should be further understood that when the neighboring cell meets any one or more of the first preset conditions, it indicates that signal quality of the neighboring cell is comparatively poor, and there is a low probability that the terminal device selects the neighboring cell. Further, the terminal device can reduce a frequency of measuring or evaluating the neighboring cell, to reduce power consumption of the terminal device.

With reference to the first aspect, in an implementation of the first aspect, the first period is greater than the second period.

According to the cell measurement method provided in this embodiment of this application, the first period used when the terminal device determines that the cell meets the first preset condition is greater than the second period used when the terminal device determines that the cell does not meet the first preset condition. It may be understood that when the cell meets the first preset condition, the terminal device reduces the frequency of measuring or evaluating the cell, to reduce the power consumption of the terminal device for measuring or evaluating the cell.

Optionally, in some embodiments, the second period may be a DRX cycle of the terminal device.

Optionally, in some other embodiments, the second period may be a multiple of a DRX cycle of the terminal device.

With reference to the first aspect and the foregoing implementations of the first aspect, in another implementation of the first aspect, that the terminal device determines that a cell meets a first preset condition includes that the terminal device determines for N times, that the cell meets the first preset condition, or the terminal device determines in a first time period, that the cell meets the first preset condition, where N is a positive integer.

According to the cell measurement method provided in this embodiment of this application, the terminal device determines that the cell meets the first preset condition based on comprehensive consideration of a plurality of times of determining results. This can improve accuracy that the terminal device determines that the cell meets the first preset condition, to avoid that the terminal device reduces a measurement or evaluation frequency because the cell meets the first preset condition at a time.

Optionally, in some embodiments, the first time period is X third periods, where X is a positive integer.

Optionally, the third period may be the first period or the second period.

With reference to the first aspect and the foregoing implementations of the first aspect, in another implementation of the first aspect, the method further includes:

the terminal device determines the measurement quantity of the cell based on at least one of a cell-specific reference signal CRS, a synchronization signal block SSB, a channel state information-reference signal CSI-RS, and a demodulation reference signal DMRS of the cell.

With reference to the first aspect and the foregoing implementations of the first aspect, in another implementation of the first aspect, the cell measurement method further includes that the terminal device determines the measurement quantity of the cell based on the at least one of the cell-specific reference signal CRS, the synchronization signal block SSB, the channel state information-reference signal CSI-RS, and the demodulation reference signal DMRS.

The SSB may alternatively be a synchronization signal/physical broadcast channel block (SS/PBCH block).

According to the cell measurement method provided in this embodiment of this application, the terminal device can determine the measurement quantity of the cell based on a plurality of types of signals, to improve flexibility that the terminal device obtains the measurement quantity of the cell.

With reference to the first aspect and the foregoing implementations of the first aspect, in another implementation of the first aspect, the measurement quantity of the cell includes: at least one of reference signal received power RSRP of the cell, an RSRP-based value, reference signal received quality RSRQ of the cell, an RSRQ-based value, a ratio SINR of power of a signal sent by the serving cell to a sum of interference and noise power, and an SINR-based value.

According to the cell measurement method provided in this embodiment of this application, the measurement quantity of the cell may be one of a plurality of measurable or calculable values, to improve the flexibility that the terminal device determines the measurement quantity of the cell.

With reference to the first aspect and the foregoing implementations of the first aspect, in another implementation of the first aspect, the second preset condition includes: at least one of the RSRP-based value is greater than or equal to a first threshold, the RSRQ-based value is greater than or equal to a second threshold, the SINR-based value is greater than or equal to a third threshold, the RSRP is greater than or equal to a fourth threshold, that the RSRQ is greater than or equal to a fifth threshold, and the SINR is greater than or equal to a sixth threshold.

In an embodiment, the RSRP-based value is Srxlev (the parameter Srxlev may be understood as a received level parameter) used in the cell selection criterion.

In an embodiment, the RSRQ-based value is Squal (the parameter Squal may be understood as received quality) used in the cell selection criterion.

In an embodiment, at least one of the first threshold, the second threshold, the third threshold, the fourth threshold, the fifth threshold, and the sixth threshold is determined based on mobility of the terminal device.

In an embodiment, the at least one of the first threshold, the second threshold, the third threshold, the fourth threshold, the fifth threshold, and the sixth threshold is determined based on a target threshold, and the target threshold is a threshold used by the terminal device to determine to measure an intra-frequency and/or a threshold used by the terminal device to determine to measure an inter-frequency.

In an embodiment, the first threshold is obtained by adding a first offset to the threshold used by the terminal device to determine to measure the intra-frequency; the first threshold is obtained by adding a second offset to the threshold used by the terminal device to determine to measure the inter-frequency; or the first threshold is obtained by adding a third offset to a maximum value of the threshold used by the terminal device to determine to measure the intra-frequency and the threshold used by the terminal device to determine to measure the inter-frequency.

In an embodiment, the second threshold is obtained by adding a fourth offset to the threshold used by the terminal device to determine to measure the intra-frequency; the first threshold is obtained by adding a fifth offset to the threshold used by the terminal device to determine to measure the inter-frequency; or the first threshold is obtained by adding a sixth offset to the maximum value of the threshold used by the terminal device to determine to measure the intra-frequency and the threshold used by the terminal device to determine to measure the inter-frequency.

According to the cell measurement method provided in this embodiment of this application, different conditions that the measurement quantity of the cell should meet are determined based on the relationship between the cell and the terminal device. When the cell is the serving cell of the terminal device, various parameters included in the measurement quantity of the serving cell should be greater than or equal to a corresponding preset threshold.

It should be understood that when the various parameters included in the measurement quantity of the serving cell are greater than or equal to the corresponding preset threshold, it may be determined that the signal quality of the serving cell is comparatively good, and a possible method for determining the signal quality of the cell is added.

With reference to the first aspect and the foregoing implementations of the first aspect, in another implementation of the first aspect, the third preset condition includes: at least one of the RSRP-based value is less than or equal to a seventh threshold, the RSRQ-based value is less than or equal to an eighth threshold, the SINR-based value is less than or equal to a ninth threshold, the RSRP is less than or equal to a tenth threshold, the RSRQ is less than or equal to an eleventh threshold, and the SINR is less than or equal to a twelfth threshold.

According to the cell measurement method provided in this embodiment of this application, the different conditions that the measurement quantity of the cell should meet are determined based on the relationship between the cell and the terminal device. When the cell is the neighboring cell of the terminal device, various parameters included in the measurement quantity of the neighboring cell should be less than or equal to a corresponding preset threshold.

It should be understood that when the various parameters included in the measurement quantity of the neighboring cell are less than or equal to the corresponding preset threshold, it may be determined that the signal quality of the neighboring cell is comparatively poor, and a possible method for determining the signal quality of the cell is added.

In an embodiment, the RSRP-based value is Rn used in the cell reselection criterion.

In an embodiment, at least one of the seventh threshold, the eighth threshold, the ninth threshold, the tenth threshold, the eleventh threshold, and the twelfth threshold is determined based on mobility of the terminal device.

In an embodiment, the at least one of the seventh threshold, the eighth threshold, the ninth threshold, the tenth threshold, the eleventh threshold, and the twelfth threshold is determined based on the measurement quantity of the serving cell of the terminal.

In an embodiment, the seventh threshold is obtained by adding a seventh offset to Rs used in the cell reselection criterion.

With reference to the first aspect and the foregoing implementations of the first aspect, in another implementation of the first aspect, the N times include N consecutive times.

According to the cell measurement method provided in this embodiment of this application, if the terminal device determines, for N consecutive times, that the cell meets the first preset condition, the terminal device can determine that the cell always meets the first preset condition in a period of time, to improve the accuracy that the terminal device determines that the cell meets the first preset condition.

With reference to the first aspect and the foregoing implementations of the first aspect, in another implementation of the first aspect, the second preset condition includes: at least one of a change range of the RSRP or the RSRP-based value is less than or equal to a thirteenth threshold, a change range of the RSRQ or the RSRQ-based value is less than or equal to a fourteenth threshold, and a change range of the SINR or the SINR-based value is less than or equal to a fifteenth threshold.

With reference to the first aspect and the foregoing implementations of the first aspect, in another implementation of the first aspect, the third preset condition includes: at least one of a change range of the RSRP or the RSRP-based value is less than or equal to a thirteenth threshold, a change range of the RSRQ or the RSRQ-based value is less than or equal to a fourteenth threshold, and a change range of the SINR or the SINR-based value is less than or equal to the fifteenth threshold.

According to the cell measurement method provided in this embodiment of this application, a prerequisite that the measurement quantity of the cell meets the preset condition further includes that a change range of a plurality of measurement quantities remains within an acceptable threshold range. This can ensure that the plurality of measurement quantities is stable, and increase accuracy of the measurement quantity.

With reference to the first aspect and the foregoing implementations of the first aspect, in another implementation of the first aspect, that a change range of the RSRP or the RSRP-based value is less than or equal to a thirteenth threshold includes: a change range of a difference between a maximum value and a minimum value of the RSRP or the RSRP-based value is less than or equal to the thirteenth threshold; or an absolute value of a difference between the RSRP and a first reference value is less than or equal to the thirteenth threshold, or an absolute value of a difference between the RSRP-based value and a second reference value is less than or equal to the thirteenth threshold; that a change range of the RSRQ or the RSRQ-based value is less than or equal to a fourteenth threshold includes: a change range of a difference between a maximum value and a minimum value of the RSRQ or the RSRQ-based value is less than or equal to the fourteenth threshold; or an absolute value of a difference between the RSRQ and a third reference value is less than or equal to the fourteenth threshold, or an absolute value of a difference between the RSRQ-based value and a fourth reference value is less than or equal to the fourteenth threshold; and that a change range of the SINR or the SINR-based value is less than or equal to a fifteenth threshold includes: a change range of a difference between a maximum value and a minimum value of the SINR or the SINR-based value is less than or equal to the fifteenth threshold; or an absolute value of a difference between the SINR and a fifth reference value is less than or equal to the fifteenth threshold, or an absolute value of a difference between the SINR-based value and a sixth reference value is less than or equal to the fifteenth threshold.

According to the cell measurement method provided in this embodiment of this application, determining whether a change of the measurement quantity of the cell is within an acceptable range is determining whether a change range of the measurement quantity is less than a preset threshold based on the difference between the maximum value and the minimum value of the measurement quantity of the cell that meets the first preset condition for the plurality of times, or determining whether a change range of the measurement quantity is less than a preset threshold based on the absolute value of the difference between a measurement quantity of the cell that meets the first preset condition for once and a preset reference value.

In an embodiment, at least one of the thirteenth threshold, the fourteenth threshold, and the fifteenth threshold is determined based on the mobility of the terminal device.

In an embodiment, the mobility of the terminal device includes at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state.

According to a second aspect, a cell measurement terminal device is provided. The terminal device may be configured to perform an operation of the terminal device in any one of the first aspect or the possible implementations of the first aspect. Specifically, the terminal device includes a corresponding component (means) configured to perform the operations or functions described in the first aspect, or may be the terminal device in the first aspect. The operations or functions may be implemented by software, hardware, or a combination of hardware and software.

According to a third aspect, a communications system is provided. A structure of the communications system includes a processor. The processor is configured to support a server in performing the functions in the first aspect and the implementations of the first aspect. In an embodiment, the server may further include a transceiver, configured to support the server in receiving or sending information. In an embodiment, the server may further include a memory. The memory is configured to be coupled to the processor, and store a program instruction and data that are necessary for the server. In other words, the server includes a memory and a processor. The memory is configured to store a computer program, and the processor is configured to invoke the computer program from the memory and run the computer program, so that the server performs the cell measurement method in any one of the first aspect and the implementations of the first aspect.

According to a fourth aspect, a computer-readable storage medium is provided. The computer-readable storage medium stores a program, and the program enables a server to perform any cell measurement method in any one of the first aspect and the implementations of the first aspect. In other words, the computer-readable storage medium is configured to store a computer software instruction used by the server, and the computer software instruction includes a program designed for performing the method in the first aspect.

According to a fifth aspect, a chip system is provided. The chip system includes a processor, configured to support a server in implementing the functions in the first aspect and the implementations of the first aspect.

According to the cell measurement method and terminal device that are provided in this application, the terminal device flexibly selects, based on the different cell situations, the period for measuring or evaluating the cell, to improve flexibility that the terminal device measures or evaluates the cell.

DESCRIPTION OF EMBODIMENTS

Figure 1:
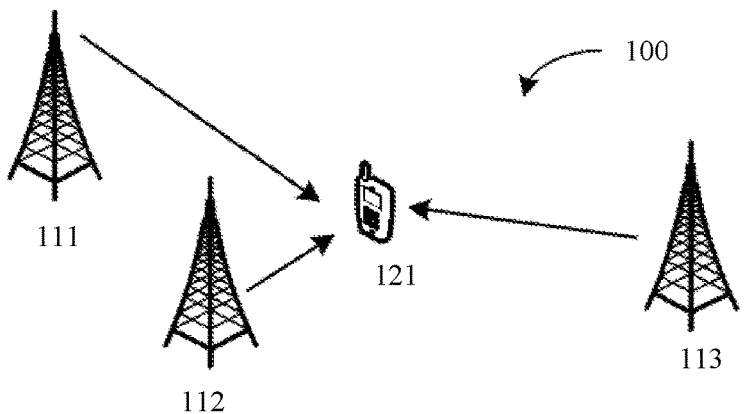
FIG. 1 is a schematic diagram of an example of a system to which a cell measurement method is applicable according to an embodiment of this application.

The following describes technical solutions of this application with reference to accompanying drawings.

Terminologies such as "component", "module", and "system" used in this specification are used to indicate computer-related entities, hardware, firmware, combinations of hardware and software, software, or software being executed. For example, a component may be, but is not limited to, a process running on a processor, a processor, an object, an executable file, a thread of execution, a program, and/or a computer. As shown in figures, both a computing device and an application running on a computing device may be components. One or more components may reside within a process and/or a thread of execution, and the component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the internet interacting with other systems by using the signal).

It should be understood that embodiments of this application may be applicable to various communications systems, for example, a global system for mobile communications (GSM), a code division multiple access (CDMA) system, a wideband code division multiple access (WCDMA) system, a general packet radio service (GPRS), a long term evolution (LTE) system, an advanced long term evolution (-A) system, a universal mobile telecommunications system ( ), a wireless local area network (WLAN), wireless fidelity (Wi-Fi), or a next generation communications system. Herein, the next generation communications system may include, for example, a 5th generation (5G) communications system.

A conventional communications system usually supports a limited quantity of connections and easy to be implemented. However, as communications technologies develop, in addition to conventional communication, a mobile communications system supports, for example, device-to-device (D2D) communication, machine-to-machine (M2M) communication, machine type communication (MTC), and vehicle-to-vehicle (V2V) communication.

The embodiments of this application describe embodiments with reference to a terminal device.

The terminal device may also be referred to as user equipment (UE), an access terminal, a subscriber unit, a subscriber station, a mobile station, a mobile console, a remote station, a remote terminal, a mobile device, a user terminal, a terminal, radio communications equipment, a user agent, a user apparatus, or the like. The terminal device may be a station (ST) in a WLAN, and may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, and a next generation communications system, for example, a terminal device in a 5G network, or a terminal device in a future evolved public land mobile network (PLMN).

As an example instead of a limitation, the terminal device in the embodiments of this application may alternatively be the wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is a hardware device, configured to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device in the embodiments of this application may alternatively be a terminal device in an internet of things (IoT) system. IoT is an important part of future development of information technologies, and a main technical feature of the IoT is connecting a thing to a network by using a communications technology, to implement an intelligent network for interconnection between a person and a machine or between one thing and another.

As an example instead of a limitation, the network device in the embodiments of this application may be a base station (BS), and the base station may have a plurality of forms, for example, a macro base station, a micro base station, a relay station, and an access point.

For example, the base station in the embodiments of this application may be a base station in NR. The base station in the NR may also be referred to as a transmission reception point (TRP), a next generation NodeB (gNB), or may be a base transceiver station (base transceiver station, BTS) in a GSM or CDMA, or may be a NodeB (NodeB, NB) in a WCDMA system, or may be an evolved NodeB (eNB or eNodeB) in an LTE system.

The network device in the embodiments of this application may alternatively include a device that is deployed in a radio access network and that can perform radio communications with a terminal, for example, the network device may be a radio controller in a cloud radio access network (CRAN) scenario, or the network device may be a relay station, an access point, a network device in a future 5G network, a network device in a future evolved public land mobile network (PLMN), for example, an evolved NodeB (eNB), a radio network controller (RNC), a NodeB (NB), a network device controller (BSC), a network device transceiver station (BTS), a home network device (for example, a home evolved NodeB, or a Home NodeB, HNB), or a baseband unit (BBU). In the embodiments of this application, an apparatus that implements a function of the network device may be the network device, or may be an apparatus that supports the network device to implement the function, such as a chip, a circuit, or another apparatus. In the embodiments of this application, an example in which the apparatus that implements the function of the network device is the network device is used to describe the technical solutions provided in the embodiments of this application.

In addition, in the embodiments of this application, the network device provides a service for a cell. The terminal device communicates with the network device by using a transmission resource (for example, a frequency domain resource or a spectrum resource) used in the cell. The cell may be a cell corresponding to the network device (for example, a base station). The cell may belong to a macro base station, or a base station corresponding to a small cell. The small cell herein may include a metro cell, a micro cell, a pico cell, a femto cell, or the like. The small cells have features such as small coverage and low transmit power, and are used to provide high-rate data transmission services.

In addition, in an LTE system or a 5G system, a plurality of cells may simultaneously work on a carrier at a same frequency. In some special scenarios, it may also be considered that a concept of the carrier is equivalent to a concept of the cell. For example, in a carrier aggregation (CA) scenario, both a carrier index of a secondary component carrier and a cell identifier (Cell ID) of a secondary serving cell that works on the secondary component carrier are carried when the secondary component carrier is configured for UE. In this case, it may be considered that the concept of the carrier is equivalent to that of the cell. For example, that the UE accesses a carrier is equivalent to that the UE accesses a cell.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), a memory (also referred to as a main memory), and the like. The operating system may be any one or more types of computer operating systems, for example, a Linux operating system, a Unix operating system, an Android operating system, an iOS operating system, or a Windows operating system, that process a service by using a process. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

In addition, aspects or features in the embodiments of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk or a magnetic tape), an optical disc (for example, a compact disc (CD), a digital versatile disc (dDVD), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a system 100 to which a cell measurement method can be applicable according to an embodiment of this application.

As shown in FIG. 1, the wireless communications system 100 may include one or more network devices, for example, a network device #1 111, a network device #2 112, and a network device #3 113 shown in FIG. 1. The wireless communications system 100 may further include one or more terminal devices, for example, a terminal device 121 shown in FIG. 1.

The wireless communications system 100 may also support CoMP transmission. In other words, a plurality of cells or a plurality of network devices may coordinately participate in transmitting data to one terminal device or jointly receive data sent by one terminal device, or a plurality of cells or a plurality of network devices perform coordinated scheduling or coordinated beamforming. The plurality of cells may belong to a same network device or different network devices, and may be selected based on a channel gain or a path loss, received signal strength, a received signal instruction, or the like.

Optionally, in the communications system 100 shown in FIG. 1, one of the network device #1 to the network device #3 (for example, the network device #1) may be a serving network device. The serving network device may indicate a network device providing an RRC connection, a non-access stratum (NAS) mobility management, and security input for the terminal device by using a radio air interface protocol. Optionally, the network device #2 and the network device #3 may be coordinated network devices. The serving network device may send control signaling to the terminal device, and the coordinated network device may send data to the terminal device; the serving network device may send control signaling to the terminal device, and the serving network device and the coordinated network device may send data to the terminal device; or both the serving network device and the coordinated network device may send control signaling to the terminal device, and both the serving network device and the coordinated network device may send data to the terminal device. Alternatively, the coordinated network device may send control signaling to the terminal device, and at least one of the serving network device and the coordinated network device may send data to the terminal device, or the coordinated network device may send control signaling and data to the terminal device. This is not particularly limited in this embodiment of this application.

It should be understood that for ease of understanding, FIG. 1 shows only an example of the network device #1 to the network device #3 and the terminal device. However, this should not constitute any limitation on this application. The wireless communications system may further include more or fewer network devices, or may include more terminal devices. Network devices communicating with different terminal devices may be a same network device, or may be different network devices. A quantity of network devices communicating with the different terminal devices may be the same, or may be different. This is not limited in this application.

The following uses the network device #1 111 and the terminal device 121 as an example to briefly describe communication between the network device and the terminal device.

The network device #1 111 may include one or more antennas. In addition, the network device #1 111 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, or an antenna) related to signal sending and receiving.

The network device #1 111 may communicate with a plurality of terminal devices. The terminal device 121 may be, for example, a cellular phone, an intelligent telephone, a portable computer, a hand-held communications device, a hand-held computing device, a satellite radio apparatus, a global positioning system, a PDA, and/or any other appropriate device used for communication in the wireless communications system 100.

As shown in FIG. 1, the terminal device 121 communicates with the network device #1 111. The network device #1 111 sends information to the terminal device 121 through a forward link (also referred to as a downlink), and receives information from the terminal device 121 through a reverse link (also referred to as an uplink).

For example, in a frequency division duplex (FDD) system, for example, the forward link and the reverse link have different frequency bands.

For another example, in a time division duplex (TDD) system and a full-duplex system, the forward link and the reverse link may have a same frequency band.

Each antenna (or an antenna group including a plurality of antennas) and/or an area designed for communication are/is referred to as a sector of the network device #1 111.

For example, the antenna group may be designed to communicate with the terminal device in the sector within coverage of the network device #1 111. The network device #1 111 may send a signal to all terminal devices in the sector corresponding to the network device #1 111 by using a single antenna or a multi-antenna transmit diversity. In a process in which the network device #1 111 communicates with the terminal device 121 by using the forward link, a transmit antenna of the network device #1 111 may also improve a signal-to-noise ratio of the forward link by using beamforming.

In addition, compared with that in a manner in which the network device #1 111 sends the signal to all the terminal devices served by the network device #1 111 by using the single antenna or the multi-antenna transmit diversity, a mobile device in a neighboring cell is less interfered when the network device #1 111 sends, through the beamforming, the signal to the terminal devices 121 that are randomly distributed within related coverage.

At given time, the network device #1 111, and the terminal device 121 may be a wireless communications sending apparatus and/or a wireless communications receiving apparatus. When sending data, the wireless communications sending apparatus may code the data for transmission. Specifically, the wireless communications sending apparatus may obtain (for example, generate, receive from another communications apparatus, or store in a memory) a particular quantity of data bits to be sent, over a channel, to the wireless communications receiving apparatus. The data bit may be included in a transport block (or a plurality of transport blocks) of the data, and the transport block may be segmented to produce a plurality of code blocks.

In addition, the communications system 100 may be a PLMN network, a D2D network, an M2M network, an IoT network, or another network. FIG. 1 is merely an example of a simplified schematic diagram. The network may further include another network device or terminal device, which is not drawn in FIG. 1.

To facilitate understanding of the technical solutions recorded in this application, a cell selection criterion and a cell reselection criterion in the prior art that are related to the embodiments of this application are first briefly described.

The cell selection criterion, also referred to as a cell selection criterion S below Specifically, the cell selection criterion S is a selection criterion that meets the following condition:

Condition: Srxlev is reference signal received power (RSRP)-based value of a cell measured by a terminal device, and Squal is a reference signal received quality (RSRQ)-based value of the cell measured by the terminal device, where Srxlev>0, and Squal>0.

The cell measured by the terminal device is not limited in the embodiments of this application.

Further, $$\text{Srxlev} = Q_{rxlevmeas} - (Q_{rxlevmin} + Q_{rxlevminoffset}) - \text{Pcompensation} - \text{Qoffset}_{temp}, \text{ and}$$

$$\text{Squal} = Q_{qualmeas} - (Q_{qualmin} + Q_{qualminoffset}) - \text{Qoffset}_{temp},$$

where $Q_{rxlevmeas}$ is RSRP of the cell measured by the terminal device;

$Q_{qualmeas}$ is RSRQ of the cell measured by the terminal device;

$Q_{rxlevmin}$ is used to indicate a minimum required receiving level in the cell measured by the terminal device, and a value of $Q_{rxlevmin}$ may be configured by a network device;

$Q_{qualmin}$ is used to indicate a minimum required quality level in the cell measured by the terminal device, and a value of $Q_{rxlevmin}$ may be configured by the network device;

$Q_{rxlevminoffset}$ is used to indicate an offset performed on $Q_{rxlevmin}$ when the terminal device camps on a visited public land mobile network (VPLMN) to search for a high-priority PLMN;

$Q_{qualminoffset}$ is used to indicate an offset performed on $Q_{qualmin}$ when the terminal device camps on the visited public land mobile network (visited public land mobile network, VPLMN) to search for the high-priority PLMN;

Pcompensation is determined based on $P_{EMAX1}$, $P_{EMAX2}$, and $P_{PowerClass}$, $P_{EMAX1}$ and $P_{EMAX2}$ are configured by the network device, and $P_{PowerClass}$ is defined in a standard protocol, and is a maximum uplink transmit power determined based on a power priority of the terminal device; and $Q_{offsettemp}$ is also configured by the network device.

Optionally, in some cases, other than $Q_{rxlevmeas}$, one or more of parameters may not appear in the foregoing Srxlev expression, and other than $Q_{qualmeas}$, one or more of parameters may not appear in the Squal expression.

For meanings of the above parameters, refer to Table 1 in the following table.

| Parameter name | Parameter description |
|---|---|
| Srxlev | Cell selection receiving level value (unit: dB) |
| Squal | Cell selection quality value (unit: dB) |
| Qoffset$_{temp}$ | Offset (unit: dB) |
| Q$_{rxlevmeas}$ | Receiving level value of a measured cell (RSRP) |
| Q$_{qualmeas}$ | Quality value of a measured cell (RSRQ) |
| Q$_{rxlevmin}$ | Minimum required receiving level in a cell (unit: dBm) |
| Q$_{qualmin}$ | Minimum required quality level in a cell (unit: dB) |
| Q$_{rxlevminoffset}$ | Offset performed on Q$_{rxlevmin}$ when a terminal device camps on a VPLMN to search for a high-priority PLMN |
| Q$_{qualminoffset}$ | Offset performed on Q$_{qualmin}$ when a terminal device camps on a VPLMN to search for a high-priority PLMN |
| Pcompensation | Determine whether a terminal device supports additional Pmax in NS-PmaxList Yes, max ($P_{EMAX1} - P_{PowerClass}$, 0) − (min ($P_{EMAX2}$, $P_{PowerClass}$) − min ($P_{EMAX1}$, $P_{PowerClass}$)) (dB); No: max ($P_{EMAX1} - P_{PowerClass}$, 0) (dB) |
| P$_{EMAX1}$, P$_{EMAX2}$ | P$_{EMAX1}$ and P$_{EMAX2}$ are obtained based on p-Max and NS-PmaxList respectively. |
| P$_{PowerClass}$ | Maximum transmit power determined based on a power level of a terminal device |

The RSRP of the cell and the RSRQ of the cell are determined based on a cell-specific reference signal (CRS).

In LTE, the RSRP of the cell is average power on a resource element (RE) carrying a CRS in a measurement bandwidth. The RSRP is used to indicate received power of a measured signal. The RSRQ is used to indicate received quality of the measured signal, and may be determined based on the RSRP and received signal strength indicator (RSSI) information.

When the terminal device camps on one cell, the terminal device periodically searches for to select a better cell according to the cell reselection criterion.

A terminal device in a radio resource control idle (RRC IDLE) state needs to measure the RSRP and the RSRQ of a serving cell in at least each discontinuous receive (DRX) cycle.

When the RSRP and the RSRQ of the serving cell (or a RSRP-based measurement value of the serving cell and a RSRQ-based measurement value of the serving cell) meet a condition 1, UE needs to measure an intra-frequency. When the RSRQ and the RSRQ of the serving cell (or the RSRP-based measurement value of the serving cell and the RSRQ-based measurement value of the serving cell) meet a condition 2, the UE needs to measure an inter-frequency. It may be understood that measuring the intra-frequency intra-frequency is measuring an intra-frequency intra-frequency cell, and measuring the inter-frequency inter-frequency cell is measuring an inter-frequency inter-frequency cell.

Measuring the intra-frequency may include measuring RSRP and RSRQ of the intra-frequency cell, and measuring the inter-frequency may include measuring RSRP and RSRQ of the inter-frequency cell.

The condition 1 is Srxlev≤$S_{IntraSearchP}$, and Squal≤ $S_{IntraSearchQ}$.

The condition 2 is Srxlev≤$S_{nonIntraSearchP}$, or Squal≤ $S_{nonIntraSearchQ}$, where $S_{IntraSearchP}$, $S_{IntraSearchQ}$, $S_{nonIntraSearchP}$, and $S_{nonIntraSearchQ}$ are configured by the network device.

When measuring the intra-frequency, the terminal device measures the RSRP and the RSRQ of the intra-frequency cell at least every $T_{measure}$ and $_{EUTRAN\_Intra}$.

When measuring the inter-frequency, the terminal device measures the RSRP and the RSRQ of the inter-frequency cell at least every $T_{measure, EUTRAN\_Inter}$, or $K \ast T_{measure, EUTRAN\_Inter}$, where K is a positive integer.

Optionally, in some embodiments, K may be a quantity of inter-frequency carriers.

Optionally, in some other embodiments, K is a multiple of a quantity of inter-frequency carriers.

Values of $T_{measure, EUTRAN\_Intra}$, $T_{measure}$, and $_{EUTRAN\_Inter}$ are specified in the standard protocol. Refer to Table 2 in the following table.

| DRX cycle length (unit: s) | $T_{measure, EUTRAN\_Intra}$ (unit: s) (Quantity of DRX cycles) | $T_{measure, EUTRAN\_Inter}$ (unit: s) (Quantity of DRX cycles) |
|---|---|---|
| 0.32 | 1.28 (4) | 1.28 (4) |
| 0.64 | 1.28 (2) | 1.28 (2) |

| DRX cycle length (unit: s) | $T_{measure, EUTRAN\_Intra}$ (unit: s) (Quantity of DRX cycles) | $T_{measure, EUTRAN\_Inter}$ (unit: s) (Quantity of DRX cycles) |
|---|---|---|
| 1.28 | 1.28 (1) | 1.28 (1) |
| 2.56 | 2.56 (1) | 2.56 (1) |

The Cell Reselection Criteria

The terminal device sorts the serving cell and a neighboring cell according to an R criterion.

Optionally, during sorting according to the R criterion, the terminal device may sort, according to the R criterion, all cells that meet the cell selection criterion S.

Specifically, the R criterion is defined as follows:

$$R_s = Q_{meas,s} + Q_{hyst} - \text{Qoffset}_{temp} + \text{Qoffset}_{SCPTM}, \text{ and}$$

$$R_n = Q_{meas,n} - \text{Qoffset} - \text{Qoffset}_{temp} + \text{Qoffset}_{SCPTM},$$

where $R_s$ is a cell sorting criterion of the serving cell; $R_n$ is a cell sorting criterion of the neighboring cell;

$Q_{meas}$ is the RSRP of the cell, and specifically, $Q_{meas,s}$ is the RSRP of the serving cell, and $Q_{meas,n}$ is the RSRP of the neighboring cell;

$Q_{offset}$ is determined based on $\text{Qoffset}_{s,n}$, and $\text{Qoffset}_{frequency}$, and $\text{Qoffset}_{s,n}$, and $\text{Qoffset}_{frequency}$ are configured by the network device; and $Q_{hyst}$, $\text{Qoffset}_{temp}$, and $\text{Qoffset}_{SCPTM}$ are configured by the network device.

For meanings and functions of the preceding parameters, refer to Table 3 in the following table.

| | |
|---|---|
| $Q_{meas}$ | A measured RSRP value of a cell |
| Qoffset | Intra-frequency measuring: If $\text{Qoffset}_{s,n}$ is valid, Qoffset equals to $\text{Qoffset}_{s,n}$, or if $\text{Qoffset}_{s,n}$ is invalid, Qoffset equals to 0. Inter-frequency measuring: for a non-NB-IoT, if $\text{Qoffset}_{s,n}$ is valid, Qoffset equals to a sum of $\text{Qoffset}_{s,n}$ plus $\text{Qoffset}_{frequency}$, or if $\text{Qoffset}_{s,n}$ is invalid, Qoffset equals to $\text{Qoffset}_{frequency}$; and for a NB-IoT, if $\text{QoffsetDedicated}_{frequency}$ is valid, Qoffset equals to $\text{QoffsetDedicated}_{frequency}$ for any frequency other than a dedicated frequency offset, or if $\text{QoffsetDedicated}_{frequency}$ is invalid, Qoffset equals to $\text{Qoffset}_{frequency}$ (if $\text{QoffsetDedicated}_{frequency}$ is valid, $\text{Qoffset}_{frequency}$ is not used). |
| $\text{Qoffset}_{temp}$ | Offset |
| $\text{Qoffset}_{SCPTM}$ | Indicates an offset of an SC-PTM frequency, and if $\text{Qoffset}_{SCPTM}$ is valid, Qoffset for an inter-frequency neighboring cell is not used. |

If one cell is a cell with a best sorting result according to the cell reselection criterion R criterion, the terminal device performs cell reselection to the cell.

In new radio (NR), some content is the same as the content in the LTE system. The differences are as follows:

1. RSRP of a cell is synchronization signal-reference signal received power (SS-RSRP) of the cell.

RSRQ of the cell is synchronization signal-reference signal received quality (SS-RSRQ) of the cell.

The SS-RSRP and the SS-RSRQ are determined based on a synchronization signal/physical broadcast channel block (SS/PBCH block).

One SS/PBCH block includes a primary synchronization signal ( ), a secondary synchronization signal (SSS), and a physical broadcast channel (PBCH). In this embodiment of this application, the SS/PBCH block is referred to as a synchronization signal block (SSB) for short.

Specifically, the SS-RSRP and the SS-RSRQ may be determined based on the SSS, or the SS-RSRP and the SS-RSRQ may be determined based on at least one of the SSS, a demodulation reference signal (DMRS) of the PBCH, and a channel state information-reference signal (CSI-RS).

2. A terminal device in an RRC IDLE mode and/or a radio resource control inactive (RRC INACTIVE) mode needs to measure the RSRP and the RSRQ of the serving cell in at least each DRX cycle.

3. Symbols and values of some time values and thresholds may be different.

Specifically, in the NR, a symbol and a value used to indicate a period in which the terminal device measures a cell, a symbol and a value used to determined whether a threshold of a neighboring cell needs to be measured, a symbol and a value used in a cell selection criterion and a cell reselection criterion may be different from those in LTE.

For example, when measuring an intra-frequency, the terminal device measures RSRP and RSRQ of an intra-frequency cell at least every $T_{measure, NR\_Intra}$. A value of $T_{measure, NR\_Intra}$ may be different from that of $T_{measure, EUTRAN\_Intra}$.

4. Definitions (or expressions) of the cell selection criteria and the cell reselection criteria may be different. Some parameters in a criterion in the LTE may not appear in a criterion in the NR, and meanings of some parameters may be different.

For example, for the cell reselection criterion R criterion, a current protocol in the NR defines the criterion as follows:

$$R_s = Q_{meas,s} + Q_{hyst}, \text{ and}$$

$$R_n = Q_{meas,n} + \text{Qoffset}.$$

For meanings and functions of the preceding parameters, refer to Table 4 in the following table.

| | |
|---|---|
| $Q_{meas}$ | A measured RSRP value of a cell |
| Qoffset | Intra-frequency measuring: If $\text{Qoffset}_{s,n}$ is valid, Qoffset equals to $\text{Qoffset}_{s,n}$, or if $\text{Qoffset}_{s,n}$ is invalid, Qoffset equals to 0. Inter-frequency measuring: If $\text{Qoffset}_{s,n}$ is valid, Qoffset equals to a sum of $\text{Qoffset}_{s,n}$ plus $\text{Qoffset}_{frequency}$; or if $\text{Qoffset}_{s,n}$ is invalid, Qoffset equals to $\text{Qoffset}_{frequency}$. |

In a process in which the terminal device measures the cell, although some content in the NR is different from the content of the LTE system, a core meaning of the content remains unchanged. For example, in the NR, the cell selection criterion is still based on the RSRP of the cell and the RSRQ of the cell. The cell reselection criterion (the R criteria) is still defined based on the RSRP of the cell.

Optionally, in some cases, other than $Q_{meas, s}$, a parameter may not appear in the expression of $R_s$, and other than $Q_{meas, n}$, a parameter may not appear in the expression of Rn.

For another example, for the cell reselection criterion R criterion, an updated protocol in the NR may further be defined as follows:

$$R_s = Q_{meas, s} + Q_{hyst} - Q_{offsettemp}, \text{ and}$$

$$R_n = Q_{meas, n} - \text{Qoffset} - \text{Qoffset}_{temp}.$$

For meanings and functions of the preceding parameters, refer to Table 5 in the following table.

| | |
|---|---|
| $Q_{meas}$ | A measured RSRP value of a cell |
| Qoffset | Intra-frequency measuring: If $Qoffset_{s,n}$ is valid, Qoffset equals to $Qoffset_{s,n}$, or if $Qoffset_{s,n}$ is invalid, Qoffset equals to 0. Inter-frequency measuring: If $Qoffset_{s,n}$ is valid, Qoffset equals to a sum of $Qoffset_{s,n}$ plus $Qoffset_{frequency}$; or if $Qoffset_{s,n}$ is invalid, Qoffset equals to $Qoffset_{frequency}$. |
| $Qoffset_{temp}$ | Temporarily indicates an offset of a cell |

Optionally, in some cases, other than $Q_{meas, s}$, one or more of the parameters may not appear in the expression of $R_s$, and other than $Q_{meas, n}$, one or more of parameters may not appear in the expression of $R_n$.

It should be understood that, with update of a standard protocol, a cell selection criterion, an expression of the cell selection criterion, a cell reselection criterion, and an expression of the cell reselection criterion may be different from the foregoing examples.

Based on a brief description of the foregoing related content, the following describes in detail a cell measurement method provided in this application with reference to FIG. 2 to FIG. 6.

Figure 2:
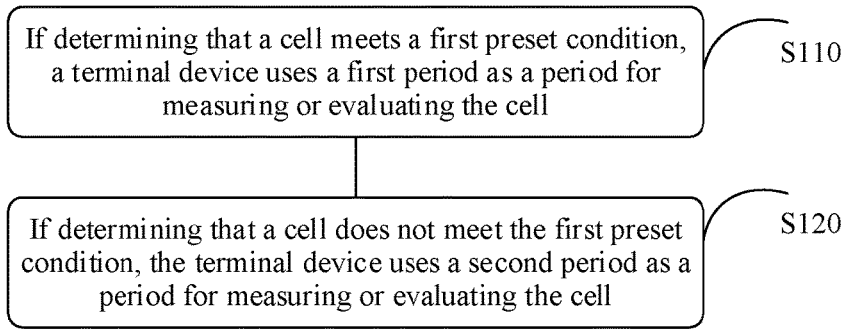
FIG. 2 is a schematic diagram of a cell measurement method according to an embodiment of this application.

FIG. 2 is a schematic diagram of a cell measurement method according to an embodiment of this application. The method includes two operations S110 and S120. The following describes the two operations in detail.

According to the cell measurement method provided in this application, a terminal device flexibly configures, based on different cell signal situations, different measurement or evaluation periods for measuring or evaluating a cell.

S110: If determining that the cell meets a first preset condition, the terminal device uses a first period as a period for measuring or evaluating the cell.

That the terminal device determines, based on whether the cell is a serving cell of the terminal device or a neighboring cell of the terminal device, whether the cell meets the first preset condition includes the following two cases:

Case 1: The cell is the serving cell of the terminal device.

When the cell is the serving cell of the terminal device, the first preset condition includes:

at least one of a measurement quantity of the serving cell meets a second preset condition, the terminal device does not measure a neighboring cell, the serving cell meets a cell selection criterion, and the serving cell meets a cell reselection criterion.

It should be understood that the terminal device does not measure the neighboring cell may be that the terminal device does not trigger measuring the neighboring cell.

Optionally, that the terminal device does not measure the neighboring cell is specifically that the terminal device does not measure a low-priority neighboring cell.

Optionally, the measuring the neighboring cell is measuring an intra-frequency neighboring cell. Optionally, the measuring the neighboring cell is measuring an inter-frequency neighboring cell.

Optionally, the terminal device may determine, based on the measurement quantity of the serving cell, whether to measure the neighboring cell. The terminal device may determine, in a prior-art method, whether to measure the neighboring cell.

The measurement quantity of the serving cell is determined by measuring a signal sent by the serving cell. The signal sent by the serving cell may be understood as a signal sent by a network device. Specifically, the measurement quantity of the serving cell is determined by the terminal device based on at least one of a specific reference signal CRS of the serving cell, a synchronization signal block SSB of the serving cell, a channel state information-reference signal CSI-RS of the serving cell, and a demodulation reference signal DMRS of a PBCH of the serving cell.

Specifically, the measurement quantity of the serving cell includes a reference signal received power RSRP of the serving cell described above, an RSRP-based value, reference signal received quality RSRQ of the serving cell, an RSRQ-based value, a ratio SINR of power of the signal sent by the serving cell to a sum of interference and noise power, and an SINR-based value.

The RSRP is used to indicate received power of a measured signal. The RSRQ is used to indicate received quality of the measured signal, and may be determined based on the RSRP and an RSSI. The RSSI is used to indicate strength of a received signal. The SINR is used to indicate a ratio of the power of the measured signal to a sum of interference and noise power.

The RSRP of the serving cell may be used to indicate received power of the signal sent by the serving cell.

The RSRQ of the serving cell may be used to indicate received quality of the signal sent by the serving cell, and may be determined based on the RSRP and the RSSI. The RSSI is used to indicate the strength of the received signal.

The SINR of the serving cell may be used to indicate a ratio of the power of the signal sent by the serving cell to a sum of the interference and the noise power.

It should be further understood that, the measurement quantity of the serving cell in NR may alternatively be an SS-RSRP of the serving cell, or an SS-RSRQ of the serving cell, where the SS-RSRP is similar to the RSRP, and the SS-RSRQ is similar to the RSRQ. Related descriptions have been provided in the foregoing related knowledge introduction. Details are not described herein again.

For example, the terminal device may determine the SS-RSRP and the SS-RSRQ based on the SSB. Specifically, the SSB includes a PSS, an SSS, and a PBCH, and the terminal device determines the SS-RSRP and the SS-RSRQ based on the SSS in the SSB.

In addition, the SS-RSRP and the SS-RSRQ (or the RSRP and the RSRQ) are determined in a prior-art determining method based on the CRS, the SSB, the CSI-RS, or the DMRS of the PBCH. This is not described herein.

Further, that the measurement quantity of the serving cell meets the second preset condition includes:

at least one of the RSRP-based value of the serving cell is greater than or equal to a first threshold, the RSRQ-based value of the serving cell is greater than or equal to a second threshold, the SINR-based value of the serving cell is greater than or equal to a third threshold, the RSRP of the serving cell is greater than or equal to a fourth threshold, the RSRQ of the serving cell is greater than or equal to a fifth threshold, and the SINR of the serving cell is greater than or equal to a sixth threshold.

Optionally, in some embodiments, the RSRP-based value of the serving cell may be Srxlev used in the cell selection criterion. The RSRQ-based value of the serving cell may be Squal used in the cell selection criterion. A value of Srxlev is determined based on the RSRP of the serving cell, and a value of Squal is determined based on RSRQ of the serving cell.

It should be understood that Srxlev and Squal may be defined in an existing standard. Details are not described herein.

Optionally, in some other embodiments, the RSRP-based value of the serving cell may be Rs used in the cell reselection criterion, for example, $R_s=Q_{meas,s}+Q_{hyst}-Qoffset_{temp}$, $R_s=Q_{meas,s}-Qoffset$, or $R_s=Q_{meas,s}+Q_{hyst}$. The RSRQ-based value of the serving cell may be Rsq, and Rsq may be $Rsq=RSRQ+/-Q_{hyst}$, or $Rsq=RSRQ+Q_{hyst}-Qoffset_{temp}$.

It should be understood that Rs used in the cell reselection criterion may be defined in an existing standard. Details are not described herein.

It should be understood that $Q_{hyst}$, Qoffset, and Qoffset$_{temp}$ may be defined in the existing standard.

Specifically, the first threshold, the second threshold, the third threshold, the fourth threshold, the fifth threshold, and the sixth threshold may be configured by the network device, may be predefined, or may be determined by the terminal.

That the first threshold, the second threshold, the third threshold, the fourth threshold, the fifth threshold, and the sixth threshold are configured by the network device includes that the network device configures the first threshold, the second threshold, the third threshold, the fourth threshold, the fifth threshold, and the sixth threshold based on system information.

For example, that the network device configures the first threshold, the second threshold, the fourth threshold, and the fifth threshold may be:

```
CellMeasInfo         SEQUENCE{
                     thresP    INTEGER (0..., 31),
                     thresQ    INTEGER (0..., 31)
                }
``` where thresP represents the first threshold, thresQ represents the second threshold, or thresP represents the fourth threshold, and thresQ represents the fifth threshold.

Specifically, the first threshold or the fourth threshold is a threshold ($S_{IntraSearchP}$ or $S_{nonIntraSearchP}$) used to trigger the terminal device to measure the intra-frequency or measure the inter-frequency. The second threshold or the fifth threshold is a threshold ($S_{IntraSearchQ}$ or $S_{nonIntraSearchQ}$) used to trigger the terminal device to measure the intra-frequency or measure the inter-frequency.

Optionally, in some embodiments, the first threshold is determined by the terminal device based on mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the first threshold. The terminal device determines the first threshold based on the mobility of the terminal device and the mapping relationship. That the terminal device determines the first threshold based on the mobility may further be specifically that the terminal device determines the first threshold based on the mobility and a first time length. The first time length may be the first period.

Optionally, in some other embodiments, the first threshold is determined based on the threshold used by the terminal device to determine to measure the intra-frequency and/or the threshold used by the terminal device to determine to measure the inter-frequency. The first threshold may be further determined based on the mobility of the terminal device, and the threshold used by the terminal device to determine to measure the intra-frequency and/or the threshold used by the terminal device to determine to measure the inter-frequency.

For example, the first threshold is the threshold ($S_{IntraSearchP}$) used by the terminal device to determine to measure the intra-frequency, the first threshold is the threshold ($S_{nonIntraSearchP}$) used by the terminal device to determine to measure the inter-frequency, or the first threshold is a maximum value of the threshold ($S_{IntraSearchP}$) used by the terminal device to determine to measure the intra-frequency and the threshold ($S_{nonIntraSearchP}$) used by the terminal device to determine to measure the inter-frequency.

For another example, the first threshold is obtained by adding an offset to the threshold ($S_{IntraSearchP}$) used by the terminal device to determine to measure the intra-frequency, the first threshold is obtained by adding an offset to the threshold ($S_{nonIntraSearchP}$) used by the terminal device to determine to measure the inter-frequency, or the first threshold is obtained by adding an offset to a maximum value of the threshold ($S_{IntraSearchP}$) used by the terminal device to determine to measure the intra-frequency and the threshold ($S_{nonIntraSearchP}$) used by the terminal device to determine to measure the inter-frequency. The offset may be configured by the network device, predefined, or determined by the terminal device. The terminal device may determine the offset based on the mobility of the terminal device. The mobility of the terminal device may include the at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the offset. The terminal device determines the offset based on the mobility of the terminal device and the mapping relationship. That the terminal device determines the offset based on the mobility may further be specifically that the terminal device determines the offset based on the mobility and the first time length. The first time length may be the first period.

For another example, the first threshold is obtained by multiplying a scale factor by the threshold ($S_{IntraSearchP}$) used by the terminal device to determine to measure the intra-frequency, the first threshold is obtained by multiplying a scale factor by the threshold ($S_{nonIntraSearchP}$) used by the terminal device to determine to measure the inter-frequency, or the first threshold is obtained by multiplying a scale factor by a maximum value of the threshold ($S_{IntraSearchP}$) used by the terminal device to determine to measure the intra-frequency and the threshold ($S_{nonIntraSearchP}$) used by the terminal device to determine to measure the inter-frequency. The scale factor may be configured by the network device, predefined, or determined by the terminal device. When the scale factor is determined by the terminal device, the terminal device may determine the scale factor based on the mobility of the terminal device. The mobility of the terminal device may include at least one of a moving speed of the terminal device, the terminal device being static, the terminal device being moving, the terminal device being at a low speed, the terminal device being at a high speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

Optionally, in some other embodiments, the first threshold is 0.

Optionally, in some embodiments, the second threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the second threshold. The terminal device determines the second threshold based on the mobility of the terminal device and the mapping relationship. That the terminal device determines the second threshold based on the mobility may further be specifically that the terminal device determines the second threshold based on the mobility and the first time length. The first time length may be the first period.

Optionally, in some other embodiments, the second threshold is determined based on the threshold used by the terminal device to determine to measure the intra-frequency and/or the threshold used by the terminal device to determine to measure the inter-frequency. The second threshold may be further determined based on the mobility of the terminal device, and the threshold used by the terminal device to determine to measure the intra-frequency and/or the threshold used by the terminal device to determine to measure the inter-frequency.

For example, the second threshold is the threshold ($S_{IntraSearchQ}$) used by the terminal device to determine to measure the intra-frequency, the second threshold is the threshold ($S_{nonIntraSearchQ}$) used by the terminal device to determine to measure the inter-frequency, or the second threshold is a maximum value of the threshold ($S_{IntraSearchQ}$) used by the terminal device to determine to measure the intra-frequency and the threshold ($S_{nonIntraSearchQ}$) used by the terminal device to determine to measure the inter-frequency.

For another example, the second threshold is obtained by adding an offset to the threshold ($S_{IntraSearchQ}$) used by the terminal device to determine to measure the intra-frequency, the second threshold is obtained by adding an offset to the threshold ($S_{nonIntraSearchQ}$) used by the terminal device to determine to measure the inter-frequency, or the second threshold is obtained by adding an offset to a maximum value of the threshold ($S_{IntraSearchQ}$) used by the terminal device to determine to measure the intra-frequency and the threshold ($S_{nonIntraSearchQ}$) used by the terminal device to determine to measure the inter-frequency. The offset may be configured by the network device, predefined, or determined by the terminal device. The terminal device may determine the offset based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the offset. The terminal device determines the offset based on the mobility of the terminal device and the mapping relationship. That the terminal device determines the offset based on the mobility may further be specifically that the terminal device determines the offset based on the mobility and a first time length. The first time length may be the first period.

For another example, the second threshold is obtained by multiplying a scale factor by the threshold ($S_{IntraSearchQ}$) used by the terminal device to determine to measure the intra-frequency, the second threshold is obtained by multiplying a scale factor by the threshold ($S_{nonIntraSearchQ}$) used by the terminal device to determine to measure the inter-frequency, or the second threshold is obtained by multiplying a scale factor by a maximum value of the threshold ($S_{IntraSearchQ}$) used by the terminal device to determine to measure the intra-frequency and the threshold ($S_{nonIntraSearchQ}$) used by the terminal device to determine to measure the inter-frequency. The scale factor may be configured by the network device, predefined, or determined by the terminal device. When the scale factor is determined by the terminal device, the terminal device may determine the scale factor based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

Optionally, in some other embodiments, the second threshold is 0.

Optionally, in some embodiments, the third threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the third threshold. The terminal device determines the third threshold based on the mobility of the terminal device and the mapping relationship. That the terminal device determines the third threshold based on the mobility may further be specifically that the terminal device determines the third threshold based on the mobility and a first time length. The first time length may be the first period.

Optionally, in some embodiments, the fourth threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the fourth threshold. The terminal device determines the fourth threshold based on the mobility of the terminal device and the mapping relationship. That the terminal device determines the fourth threshold based on the mobility may further be specifically that the terminal device determines the fourth threshold based on the mobility and a first time length. The first time length may be the first period.

Optionally, in some other embodiments, the fourth threshold is determined based on the threshold used by the terminal device to determine to measure the intra-frequency and/or the threshold used by the terminal device to determine to measure the inter-frequency. The fourth threshold may be further determined based on the mobility of the terminal device, and the threshold used by the terminal device to determine to measure the intra-frequency and/or the threshold used by the terminal device to determine to measure the inter-frequency.

For example, the fourth threshold is the threshold ($S_{IntraSearchP}$) used by the terminal device to determine to measure the intra-frequency, the fourth threshold is the threshold ($S_{nonIntraSearchP}$) used by the terminal device to determine to measure the inter-frequency, or the fourth threshold is a maximum value of the threshold ($S_{IntraSearchP}$) used by the terminal device to determine to measure the intra-frequency and the threshold ($S_{nonIntraSearchP}$) used by the terminal device to determine to measure the inter-frequency.

For another example, the fourth threshold is obtained by adding $((Q_{rxlevmin}+Q_{rxlevminoffset})+P_{compensation}+Q_{offsettemp})$ to the threshold ($S_{IntraSearchP}$) used by the terminal device to determine to measure the intra-frequency, the fourth threshold is obtained by adding $((Q_{rxlevmin}+Q_{rxlevminoffset})+P_{compensation}+Q_{offsettemp})$ to the threshold ($S_{nonIntraSearchP}$) used by the terminal device to determine to measure the inter-frequency, or the fourth threshold is obtained by adding $((Q_{rxlevmin}+Q_{rxlevminoffset})+P_{compensation}+Q_{offsettemp})$ to a maximum value of the threshold ($S_{IntraSearchP}$) used by the terminal device to determine to measure the intra-frequency and the threshold ($S_{nonIntraSearchP}$) used by the terminal device to determine to measure the inter-frequency.

For another example, the fourth threshold is obtained by adding an offset to $((Q_{rxlevmin}+Q_{rxlevminoffset})+P_{compensation}+\text{Qoffset}_{temp})$ and the threshold ($S_{IntraSearchP}$) used by the terminal device to determine to measure the intra-frequency, the fourth threshold is obtained by adding an offset to $((Q_{rxlevmin}+Q_{rxlevminoffset})+P_{compensation}+\text{Qoffset}_{temp})$ and the threshold ($S_{nonIntraSearchP}$) used by the terminal device to determine to measure the inter-frequency, or the fourth threshold is obtained by adding an offset to $((Q_{rxlevmin}+Q_{rxlevminoffset})+P_{compensation}+Q_{offsettemp})$ and a maximum value of the threshold ($S_{IntraSearchP}$) used by the terminal device to determine to measure the intra-frequency and the threshold ($S_{nonIntraSearchP}$) used by the terminal device to determine to measure the inter-frequency. The offset may be configured by the network device, predefined, or determined by the terminal device. The terminal device may determine the offset based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the offset. The terminal device determines the offset based on the mobility of the terminal device and the mapping relationship. That the terminal device determines the offset based on the mobility may further be specifically that the terminal device determines the offset based on the mobility and a first time length. The first time length may be the first period.

For another example, the fourth threshold is obtained by multiplying a scale factor by a sum of n $((Q_{rxlevmin}+Q_{rxlevminoffset})+P_{compensation}+Q_{offsettemp})$ and the threshold ($S_{IntraSearchP}$) used by the terminal device to determine to measure the intra-frequency, the fourth threshold is obtained by multiplying a scale factor by a sum of $((Q_{rxlevmin}+Q_{rxlevminoffset})+P_{compensation}+\text{Qoffset}_{temp})$ and the threshold ($S_{nonIntraSearchP}$) used by the terminal device to determine to measure the inter-frequency, or the fourth threshold is obtained by multiplying a scale factor by a sum of $((Q_{rxlevmin}+Q_{rxlevminoffset})+P_{compensation}+Q_{offsettemp})$ and a maximum value of the threshold ($S_{IntraSearchP}$) used by the terminal device to determine to measure the intra-frequency and the threshold ($S_{nonIntraSearchP}$) used by the terminal device to determine to measure the inter-frequency. The scale factor may be configured by the network device, predefined, or determined by the terminal device. The terminal device may determine the scale factor based on mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

For another example, the fourth threshold is obtained by adding $((Q_{rxlevmin}+Q_{rxlevminoffset})+P_{compensation}+Q_{offsettemp})$ to a product of a scale factor and the threshold ($S_{IntraSearchP}$) used by the terminal device to determine to measure the intra-frequency, the fourth threshold is obtained by adding $((Q_{rxlevmin}+Q_{rxlevminoffset})+P_{compensation}+Q_{offsettemp})$ to a product of a scale factor and the threshold ($S_{nonIntraSearchP}$) used by the terminal device to determine to measure the inter-frequency, or the fourth threshold is obtained by adding $((Q_{rxlevmin}+Q_{rxlevminoffset})+P_{compensation}+\text{Qoffset}_{temp})$ to a product of a scale factor and a maximum value of the threshold ($S_{IntraSearchP}$) used by the terminal device to determine to measure the intra-frequency and the threshold ($S_{nonIntraSearchP}$) used by the terminal device to determine to measure the inter-frequency. The scale factor may be configured by the network device, predefined, or determined by the terminal device. When the scale factor is determined by the terminal device, the terminal device may determine the scale factor based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

Optionally, in some other embodiments, the fourth threshold is $((Q_{rxlevmin}+Q_{rxlevminoffset})+P_{compensation}+Q_{offsettemp})$.

Optionally, in some embodiments, the fifth threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the fifth threshold. The terminal device determines the fifth threshold based on the mobility of the terminal device and the mapping relationship. That the terminal device determines the fifth threshold based on the mobility may further be specifically that the terminal device determines the fifth threshold based on the mobility and a first time length. The first time length may be the first period.

Optionally, in some other embodiments, the fifth threshold is determined based on the threshold used by the terminal device to determine to measure the intra-frequency and/or the threshold used by the terminal device to determine to measure the inter-frequency. The fifth threshold may be further determined based on the mobility of the terminal device, and the threshold used by the terminal device to determine to measure the intra-frequency and/or the threshold used by the terminal device to determine to measure the inter-frequency.

For example, the fifth threshold is the threshold ($S_{IntraSearchQ}$) used by the terminal device to determine to measure the intra-frequency, the fifth threshold is the threshold ($S_{nonIntraSearchQ}$) used by the terminal device to determine to measure the inter-frequency; or the fifth threshold is a maximum value of the threshold ($S_{IntraSearchQ}$) used by the terminal device to determine to measure the intra-frequency and the threshold ($S_{nonIntraSearchQ}$) used by the terminal device to determine to measure the inter-frequency.

For another example, the fifth threshold is obtained by adding $((Q_{qualmin}+Q_{qualminoffset})++Q_{offsettemp})$ to the threshold ($S_{IntraSearchQ}$) used by the terminal device to determine to measure the intra-frequency, the fifth threshold is obtained by adding $((Q_{qualmin}+Q_{qualminoffset})+Qoffset_{temp})$ to the threshold ($S_{nonIntraSearchQ}$) used by the terminal device to determine to measure the inter-frequency, or the fifth threshold is obtained by adding $((Q_{qualmin}+Q_{qualminoffset})+Qoffset_{temp})$ to a maximum value of the threshold ($S_{IntraSearchQ}$) used by the terminal device to determine to measure the intra-frequency and the threshold ($S_{nonIntraSearchQ}$) used by the terminal device to determine to measure the inter-frequency.

For another example, the fifth threshold is obtained by adding an offset to $((Q_{qualmin}+Q_{qualminoffset})+Qoffset_{temp})$ and the threshold ($S_{IntraSearchQ}$) used by the terminal device to determine to measure the intra-frequency, the fifth threshold is obtained by adding an offset to $((Q_{qualmin}+Q_{qualminoffset})+Q_{offsettemp})$ and the threshold ($S_{nonIntraSearchQ}$) used by the terminal device to determine to measure the inter-frequency, or the fifth threshold is obtained by adding an offset to $((Q_{qualmin}+Q_{qualminoffset})+Qoffset_{temp})$ and the maximum value of the threshold ($S_{IntraSearchQ}$) used by the terminal device to determine to measure the intra-frequency and the threshold ($S_{nonIntraSearchQ}$) used by the terminal device to determine to measure the inter-frequency. The offset may be configured by the network device, predefined, or determined by the terminal device. The terminal device may determine the offset based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the offset. The terminal device determines the offset based on the mobility of the terminal device and the mapping relationship. That the terminal device determines the offset based on the mobility may further be specifically that the terminal device determines the offset based on the mobility and a first time length. The first time length may be the first period.

For another example, the fifth threshold is obtained by multiplying a scale factor by a sum of $((Q_{qualmin}+Q_{qualminoffset})+Qoffset_{temp})$ and the threshold ($S_{IntraSearchQ}$) used by the terminal device to determine to measure the intra-frequency, or the fifth threshold is obtained by multiplying a scale factor by a sum of an $((Q_{qualmin}+Q_{qualminoffset})+Qoffset_{temp})$ and the threshold ($S_{nonIntraSearchQ}$) used by the terminal device to determine to measure the inter-frequency, or the fifth threshold is obtained by multiplying a scale factor by a sum of $((Q_{qualmin}+Q_{qualminoffset})+Qoffset_{temp})$ and a maximum value of the threshold ($S_{IntraSearchQ}$) used by the terminal device to determine to measure the intra-frequency and the threshold ($S_{nonIntraSearchQ}$) used by the terminal device to determine to measure the inter-frequency. The scale factor may be configured by the network device, predefined, or determined by the terminal device. The terminal device may determine the scale factor based on mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

For another example, the fifth threshold is obtained by adding $((Q_{qualmin}+Q_{qualminoffset})+Qoffset_{temp})$ to a product of a scale factor and the threshold $(S_{IntraSearchQ})$ used by the terminal device to determine to measure the intra-frequency, the fifth threshold is obtained by adding $((Q_{qualmin}+Q_{qualminoffset})$ $Qoffset_{temp})$ to a product of a scale factor and the threshold $(S_{nonIntraSearchQ})$ used by the terminal device to determine to measure the inter-frequency, or the fifth threshold is obtained by adding $((Q_{qualmin}+Q_{qualminoffset})+Qoffset_{temp})$ to a product of a scale factor and a maximum value of the threshold $(S_{IntraSearchQ})$ used by the terminal device to determine to measure the intra-frequency and the threshold $(S_{nonIntraSearchQ})$ used by the terminal device to determine to measure the inter-frequency. The scale factor may be configured by the network device, predefined, or determined by the terminal device. When the scale factor is determined by the terminal device, the terminal device may determine the scale factor based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

Optionally, in some other embodiments, the fifth threshold is an $((Q_{qualmin}+Q_{qualminoffset})++Qoffset_{temp})$.

Optionally, in some embodiments, the sixth threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the sixth threshold. The terminal device determines the sixth threshold based on the mobility of the terminal device and the mapping relationship. That the terminal device determines the sixth threshold based on the mobility may further be specifically that the terminal device determines the sixth threshold based on the mobility and a first time length. The first time length may be the first period.

Further, that the serving cell meets the cell selection criterion is that the serving cell meets the cell selection criterion S criterion.

It should be understood that the parameter Srxlev used in the cell selection criterion S is the SS-RSRP (or RSRP)-based value, and the parameter Squal used in the cell selection criterion S is the SS-RSRQ (or RSRQ)-based value. Therefore, after determining the SS-RSRP or the SS-RSRQ based on the at least one of the CRS, the SSB, the CSI-RS, and the DMRS, the terminal device can determine whether the serving cell meets the cell selection criterion.

Further, that the serving cell meets the cell reselection criterion may be understood as:

the terminal device may reselect the serving cell, or a sorting result of the serving cell is the best according to the cell reselection criterion defined in the existing standard.

It should be understood that the parameters Rs and Rn in the cell reselection criterion R are the SS-RSRP (or the RSRP)-based value. Therefore, after determining the SS-RSRP based on the at least one of the CRS, the SSB, the CSI-RS, and the DMRS, the terminal device can determine whether the serving cell meets the cell reselection criteria.

Optionally, in some embodiments, the terminal device determines, for N times, that the serving cell meets the first preset condition, or the terminal device determines in a first time period, that the serving cell meets the first preset condition, where N is a positive integer.

Optionally, in some embodiments, N is configured by the network device. Further, the network device may configure N based on system information.

Optionally, in some other embodiments, N is predefined.

Optionally, in some embodiments, the first time period is X third periods, where X is a positive integer. Optionally, the third period may be the first period or the second period.

For example, when the terminal device determines, for N consecutive times, that the serving cell meets the first preset condition, the terminal device determines that the serving cell meets the first preset condition.

Alternatively, the terminal device determines, for M times, whether the serving cell meets the first preset condition. When the terminal device determines, for N times in the M times, that the serving cell meets the first preset condition, the terminal device determines that the serving cell meets the first preset condition, where M is a positive integer, and N is an integer greater than or equal to M/2 and less than or equal to M.

Alternatively, the terminal device determines, for M times, whether the serving cell meets the first preset condition. When the terminal device determines, for N times in the M times, that the serving cell meets the first preset condition, the terminal device determines that the serving cell meets the first preset condition, where M is a positive integer, and N is an integer greater than or equal to 1 and less than or equal to M.

It should be understood that a time interval between every two times of determining, by the terminal device, whether the cell meets the first preset condition may be the first period or the second period.

Alternatively, the terminal device determines in the first time period, that the serving cell meets the first preset condition. Duration of the first time period may be configured by the network device, or may be predefined.

Alternatively, that the terminal device determines, for a plurality of times in the first time period, that the serving cell meets the first preset condition may be understood as that the terminal device determines, for a total of M times in the first time period, whether the serving cell meets the first preset condition, and determines, for N times in the M times that the serving cell meets the first preset condition, where M is a positive integer, and N is an integer greater than or equal to M/2 and less than or equal to M, or N is an integer greater than or equal to 1 and less than or equal to M.

Specifically, the first time period may be the X third periods. That the terminal device determines, in the first time period, whether the serving cell meets the first preset condition may be that the terminal device determines, in each third period, whether the serving cell meets the first preset condition.

Further, when the terminal device determines, in at least one third period of the X third periods, that the serving cell meets the first preset condition, it may be considered that the terminal device determines, in the first time period, that the serving cell meets the first preset condition.

Alternatively, when the terminal device determines, in each third period of the X third periods, that the serving cell meets the first preset condition, it may be considered that the terminal device determines, in the first time period, that the serving cell meets the first preset condition.

Alternatively, when the terminal device determines, in Y third periods of the X third periods, that the serving cell meets the first preset condition, it may be considered that the terminal device determines, in the first time period, that the serving cell meets the first preset condition, where Y is an integer greater than or equal to X/2 and less than or equal to X, or Y is an integer greater than or equal to 1 and less than or equal to X.

It should be understood that, in each third period, the terminal device may determine, for one or more times, whether the serving cell meets the first preset condition.

When the terminal device determines, for one or more times in each third period, whether the serving cell meets the first preset condition, and the serving cell meets the first preset condition for P times, the terminal device determines that the serving cell meets the first preset condition in the first period, where P is a positive integer.

For example, the terminal device determines, for Q times in one third period, whether the serving cell meets the first preset condition. When the terminal device determines, for P times in the Q times that the serving cell meets the first preset condition, the terminal device determines that the serving cell meets the first preset condition in the third period, where Q is a positive integer, and P is an integer greater than or equal to Q/2 and less than or equal to Q.

Alternatively, the terminal device determines, for Q times in one third period, whether the serving cell meets the first preset condition. When the terminal device determines, for P times in the Q times that the serving cell meets the first preset condition, the terminal device determines that the serving cell meets the first preset condition in the third period, where Q is a positive integer, and P is an integer greater than or equal to 1 and less than or equal to Q.

Optionally, the terminal device may flexibly select different measurement periods for measuring or evaluating the cell based on whether the signal of the serving cell is stable, or the terminal device determines whether the signal of the serving cell is stable based on the change range of the RSRP, the RSRP-based value, the RSRQ, the RSRQ-based value, the SINR, or the SINR-based value to ensure that a result of determining whether the serving cell meets the first preset condition is determined when the signal of the serving cell is stable.

For example, when the change range of the RSRP or RSRP-based value is less than or equal to the thirteenth threshold, and/or the change range of the RSRQ or the RSRQ-based value is less than or equal to the fourteenth threshold, it is considered that the signal of the serving cell is stable, and/or when the change range of the SINR or SINR-based value is less than or equal to the fifteenth threshold, it is considered that the signal of the serving cell is stable.

Determining that the change range of the RSRP or RSRP-based value is less than or equal to the thirteenth threshold includes:

a difference between a maximum value and a minimum value of the RSRP or the RSRP-based value is less than or equal to the thirteenth threshold, an absolute value of a difference between the RSRP and a first reference value is less than or equal to the thirteenth threshold, or an absolute value of a difference between the RSRP-based value and a second reference value is less than or equal to the thirteenth threshold.

Determining that the change range of the RSRQ or the RSRQ-based value is less than or equal to the fourteenth threshold includes:

a difference between a maximum value and a minimum value of the RSRQ or the RSRQ-based value is less than or equal to the fourteenth threshold;

an absolute value of a difference between the RSRQ and a third reference value is less than or equal to the fourteenth threshold, or an absolute value of a difference between the RSRQ-based value and a fourth reference value is less than or equal to the fourteenth threshold.

Determining that the change range of the SINR or the SINR-based value is less than or equal to the fifteenth threshold includes:

a change range of a difference between a maximum value and a minimum value of the SINR or the SINR-based value is less than or equal to the fifteenth threshold;

an absolute value of a difference between the SINR and a fifth reference value is less than or equal to the fifteenth threshold, or an absolute value of a difference between the SINR-based value and a sixth reference value is less than or equal to the fifteenth threshold.

Determining that the absolute value of the difference between the RSRP and the first reference value is less than or equal to the thirteenth threshold may be that absolute values that are of differences between the RSRP of the serving cell and the first reference value and that are obtained by measuring a plurality of times are less than or equal to the thirteenth threshold, or may be at least one absolute value of the absolute values that are of the differences between the RSRP of the serving cell and the first reference value and that are obtained by measuring the plurality of times is less than or equal to the thirteenth threshold.

Determining that the absolute value of the difference between the RSRP-based value and the second reference value is less than or equal to the thirteenth threshold may be that absolute values that are of differences between the RSRP-based value and the second reference value and that are obtained by measuring a plurality of times are less than or equal to the thirteenth threshold, or may be at least one absolute value of the absolute values that are of the differences between the RSRP-based value and the second reference value and that are obtained by measuring the plurality of times is less than or equal to the thirteenth threshold.

Determining that the absolute value of the difference between the RSRQ and the third reference value is less than or equal to the fourteenth threshold may be that absolute values that are of differences between the RSRQ of the neighboring cell and the third reference value and that are obtained by measuring a plurality of times are less than or equal to the fourteenth threshold, or may be at least one absolute value of the absolute values that are of the differences between the RSRQ of the neighboring cell and the third reference value and that are obtained by measuring the plurality of times is less than or equal to the fourteenth threshold.

Determining that the absolute value of the difference between the RSRQ-based value and the fourth reference value is less than or equal to the fourteenth threshold may be that absolute values that are of differences between the RSRQ-based value and the fourth reference value and that are obtained by measuring a plurality of times are less than or equal to the fourteenth threshold, or may be at least one absolute value of the absolute values that are of the differences between the RSRQ-based value and the fourth reference value and that are obtained by measuring the plurality of times is less than or equal to the fourteenth threshold.

Determining that the absolute value of the difference between the SINR and the fifth reference value is less than or equal to the fifteenth threshold may be that absolute values that are of differences between the SINR of the neighboring cell and the fifth reference value and that are obtained by measuring a plurality of times are less than or equal to the fifteenth threshold, or may be at least one absolute value of the absolute values that are of the differences between the SINR of the neighboring cell and the fifth reference value and that are obtained by measuring the plurality of times is less than or equal to the fifteenth threshold.

Determining that the absolute value of the difference between the SINR-based value and the sixth reference value is less than or equal to the fifteenth threshold may be that absolute values that are of differences between the SINR-based value and the sixth reference value and that are obtained by measuring a plurality of times are less than or equal to the fifteenth threshold, or may be at least one absolute value of the absolute values that are of the differences between the SINR-based value and the sixth reference value and that are obtained by measuring the plurality of times is less than or equal to the fifteenth threshold.

For example, RSRP of the serving cell is separately measured as 1, 2, and 3 in three times, and it is assumed that the thirteenth threshold is 1.

First, the difference between the maximum value and the minimum value of the RSRP is calculated as 2. In this case, the difference is greater than the value of the thirteenth threshold, which proves that the signal is not stable enough. It is further determined that the serving cell does not meet the second preset condition.

For another example, RSRP of the serving cell is separately measured as 1, 2, and 3 in three times, the first reference value is 2, and it is assumed that the thirteenth threshold is 1.

First, the absolute values of the differences between the RSRP and the first reference value are respectively calculated as 1, 0, and 1. In this case, the absolute values of the differences between the RSRP and the first reference value are all less than or equal to the thirteenth threshold, which proves that the signal is stable.

Alternatively, assuming that the thirteenth threshold is 0, only one absolute value of the absolute values of the differences between the RSRP and the first reference value is less than or equal to the thirteenth threshold, which may also prove that the signal is stable.

For another example, the RSRP of the serving cell is measured as 1, the first reference value is 2, and it is assumed that the thirteenth threshold is 1. First, the absolute value of the difference between the RSRP and the first reference value is calculated as 1. In this case, the absolute value of the difference between the RSRP and the first reference value is less than or equal to the thirteenth threshold, which proves that the signal is stable.

Whether the serving cell meets the first preset condition is determined based on the foregoing determining method.

Determining that the change range of the RSRQ or the RSRQ-based value is less than or equal to the fourteenth threshold, determining that the change range of the SINR or the SINR-based value is less than or equal to the fifteenth threshold, and determining that the change range of the RSRP-based value is less than or equal to the thirteenth threshold are similar to the foregoing determining that the change range of the RSRP is less than or equal to the thirteenth threshold. Examples are not described herein again.

The thirteenth threshold, the fourteenth threshold, and the fifteenth threshold may be configured by the network device, may be predefined, or may be determined by the terminal.

Optionally, in some embodiments, the thirteenth threshold, the fourteenth threshold, and the fifteenth threshold are determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the first threshold. The terminal device determines the first threshold based on the mobility of the terminal device and the mapping relationship. That the terminal device determines the first threshold based on the mobility may further be specifically that the terminal device determines the first threshold based on the mobility and a first time length. The first time length may be the first period.

Case 2: The cell is the neighboring cell of the terminal device.

When the to-be-measured cell or to-be-evaluated cell is the neighboring cell of the terminal device, the first preset condition includes:

at least one of a measurement quantity of the neighboring cell meets a third preset condition, the neighboring cell does not meet a cell selection criterion, and the neighboring cell does not meet a cell reselection criterion.

The measurement quantity of the neighboring cell is determined by measuring a signal sent by the neighboring cell. The signal sent by the neighboring cell may be understood as a signal sent by a network device. Specifically, the measurement quantity of the neighboring cell is determined by the terminal device based on at least one of a specific reference signal CRS of the neighboring cell, a synchronization signal block SSB of the neighboring cell, a channel state information-reference signal CSI-RS of the neighboring cell, and a demodulation reference signal DMRS of a PBCH of the neighboring cell.

Specifically, the measurement quantity of the neighboring cell includes a reference signal received power RSRP of the neighboring cell described above, an RSRP-based value, reference signal received quality RSRQ of the neighboring cell, an RSRQ-based value, a ratio SINR of power to interference and noise power of a signal sent by the neighboring cell, and an SINR-based value.

The RSRP is used to indicate received power of a measured signal. The RSRQ is used to indicate received quality of the measured signal, and may be determined based on the RSRP and an RSSI. The RSSI is used to indicate strength of a received signal. The SINR is used to indicate a ratio of the power of the measured signal to a sum of the interference and the noise power.

The RSRP of the neighboring cell may be used to indicate received power of the signal sent by the neighboring cell.

The RSRQ of the neighboring cell may be used to indicate received quality of the signal sent by the neighboring cell, and may be determined based on the RSRP and the RSSI. The RSSI is used to indicate strength of the received signal.

The SINR of the neighboring cell may be used to indicate the ratio of the power of the signal sent by the neighboring cell to a sum of the interference and the noise power.

It should be further understood that, the measurement quantity of the neighboring cell in NR may alternatively be an SS-RSRP of the neighboring cell, or an S S-RSRQ of the neighboring cell, where the SS-RSRP is similar to the RSRP, and the SS-RSRQ is similar to the RSRQ. Related descriptions have been provided in the foregoing related knowledge introduction. Details are not described herein again.

Further, that the measurement quantity of the neighboring cell meets the third preset condition includes:

at least one of the RSRP-based value of the neighboring cell is less than or equal to a seventh threshold, the RSRQ-based value of the neighboring cell is less than or equal to an eighth threshold, the SINR-based value is less than or equal to a ninth threshold, the RSRP of the neighboring cell is less than or equal to a tenth threshold, the RSRQ of the neighboring cell is less than or equal to an eleventh threshold, and the SINR is less than or equal to a twelfth threshold.

Optionally, in some embodiments, the RSRP-based value of the neighboring cell may be Srxlev used in the cell selection criterion. The RSRQ-based value of the neighboring cell may be Squal used in the cell selection criterion. A value of Srxlev is determined based on the RSRP of the neighboring cell, and a value of Squal is determined based on RSRQ of the neighboring cell.

It should be understood that Srxlev and Squal may be defined in an existing standard. Details are not described herein.

Optionally, in some other embodiments, the RSRP-based value of the neighboring cell may be Rn used in the cell reselection criterion, for example, $R_n=Q_{meas, n}-Qoffset-Qoffset_{temp}$, or $R_n=Q_{meas, n}-Qoffset$, where $Q_{meas,n}$ is RSRQ of the RSRP of the neighboring cell. The RSRQ-based value of the neighboring cell may be Rnq, and Rnq may be $Rnq=RSRQ+/-Q_{hyst}$, or $Rnq=RSRQ+/-Qoffset$, or $Rsq=RSRQ+/-Q_{hyst}-Qoffset_{temp}$, or $Rsq=RSRQ+/-Qoffset-Qoffset_{temp}$, where the RSRQ is the RSRQ of the neighboring cell.

It should be understood that Rn used in the cell reselection criterion may be defined in an existing standard. Details are not described herein.

It should be understood that $Q_{hyst}$, Qoffset, and $Qoffset_{temp}$ may be defined in the existing standard.

Specifically, the seventh threshold, the eighth threshold, the ninth threshold, the tenth threshold, the eleventh threshold, and the twelfth threshold may be configured by the network device, may be predefined, or may be determined by a terminal.

The seventh threshold, the eighth threshold, the ninth threshold, the tenth threshold, the eleventh threshold, and the twelfth threshold are configured by the network device includes that the network device configures the seventh threshold, the eighth threshold, the ninth threshold, the tenth threshold, the eleventh threshold, and the twelfth threshold based on system information.

For example, that the network device configures the seventh threshold, the eighth threshold, the tenth threshold, and the eleventh threshold may be:

| | |
|---|---|
| CellMeasInfo | SEQUENCE{ |
| | thresP    INTEGER (0..., 31), |
| | thresQ    INTEGER (0..., 31) |
| | } | where thresP represents the seventh threshold, thresQ represents the eighth threshold, or thresP represents the tenth threshold, and thresQ represents the eleventh threshold.

Specifically, the seventh threshold or the tenth threshold is a threshold ($S_{IntraSearchP}$ or $S_{nonIntraSearchP}$) used to trigger the terminal device to measure an intra-frequency or measure an inter-frequency, the eighth threshold or the eleventh threshold is a threshold ($S_{IntraSearchQ}$ or $S_{nonIntraSearchQ}$) used to trigger the terminal device to measure an intra-frequency or measure an inter-frequency.

Specifically, the seventh threshold may be 0, and the eighth threshold may be 0, or the seventh threshold may be Rs+/−offset 1, and the eighth threshold may be Rsq+/−offset 2.

The tenth threshold is the RSRP of the serving cell of the terminal device+/−offset 3, and the eleventh threshold is the RSRQ of the serving cell of the terminal device+/−offset 4.

Rs is an RSRP-based value of the serving cell of the terminal device, and Rs may be defined in the existing standard. Rsq is an RSRQ-based value of the serving cell of the terminal device, and Rsq may be $Rsq=RSRQ+/-Qhyst$, or $Rsq=RSRQ+/-Qhyst-Qoffsettemp$, where Qhyst and Qoffsettemp are defined in the existing standard. The offset 1, offset 2, offset 3, or offset 4 is a parameter configured by the network device or predefined by the network device.

Optionally, in some embodiments, the seventh threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the seventh threshold. The terminal device determines the seventh threshold based on the mobility of the terminal device and the mapping relationship. That the terminal device determines the seventh threshold based on the mobility may further be specifically that the terminal device determines the seventh threshold based on the mobility and a first time length. The first time length may be the first period.

Optionally, in some other embodiments, the seventh threshold is determined based on the threshold used by the terminal device to determine to measure the intra-frequency and/or the threshold used by the terminal device to determine to measure the inter-frequency. The seventh threshold may be further determined based on the mobility of the terminal device, and the threshold used by the terminal device to determine to measure the intra-frequency and/or the threshold used by the terminal device to determine to measure the inter-frequency.

For example, the seventh threshold is the threshold ($S_{IntraSearchP}$) used by the terminal device to determine to measure the intra-frequency, the seventh threshold is the threshold ($S_{nonIntraSearchP}$) used by the terminal device to determine to measure the inter-frequency, or the seventh threshold is a minimum value of the threshold ($S_{IntraSearchP}$) used by the terminal device to determine to measure the intra-frequency and the threshold ($S_{nonIntraSearchP}$) used by the terminal device to determine to measure the inter-frequency.

Optionally, in some other embodiments, the seventh threshold is determined based on the RSRP of the serving cell. The seventh threshold may be further determined based on the RSRP of the serving cell and the mobility of the terminal device. Further, the seventh threshold is determined based on the RSRP-based value of the serving cell of the terminal device. The RSRP-based value of the serving cell of the terminal device may be Rs in the cell reselection criterion, where Rs is the RSRP-based value of the serving cell of the terminal device, and Rs may be defined in the existing standard. For example, the seventh threshold is obtained by adding an offset to the RSRP-based value of the serving cell of the terminal device. The offset may be greater than 0, less than 0, or equal to 0. The offset may be configured by the network device, predefined, or determined by the terminal device. The terminal device may determine the offset based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the offset. The terminal device determines the offset based on the mobility of the terminal device and the mapping relationship. That the terminal device determines the offset based on the mobility may further be specifically that the terminal device determines the offset based on the mobility and a first time length. The first time length may be the first period.

For another example, the seventh threshold is obtained by multiplying a scale factor by the RSRP-based value of the serving cell of the terminal device. The scale factor may be greater than 1, less than 1, or equal to 1. The scale factor may be configured by the network device, predefined, or determined by the terminal device. When the scale factor is determined by the terminal device, the terminal device may determine the scale factor based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

Optionally, in some other embodiments, the seventh threshold is 0.

Optionally, in some embodiments, the eighth threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the eighth threshold. The terminal device determines the eighth threshold based on the mobility of the terminal device and the mapping relationship. That the terminal device determines the eighth threshold based on the mobility may further be specifically that the terminal device determines the eighth threshold based on the mobility and a first time length. The first time length may be the first period.

Optionally, in some other embodiments, the eighth threshold is determined based on the threshold used by the terminal device to determine to measure the intra-frequency and/or the threshold used by the terminal device to determine to measure the inter-frequency. The eighth threshold may be further determined based on the mobility of the terminal device, and the threshold used by the terminal device to determine to measure the intra-frequency and/or the threshold used by the terminal device to determine to measure the inter-frequency.

For example, the eighth threshold is the threshold ($S_{IntraSearchQ}$) used by the terminal device to determine to measure the intra-frequency, the eighth threshold is the threshold ($S_{nonIntraSearchQ}$) used by the terminal device to determine to measure the inter-frequency, or the eighth threshold is a minimum value of the threshold ($S_{IntraSearchQ}$) used by the terminal device to determine to measure the intra-frequency and the threshold ($S_{nonIntraSearchQ}$) used by the terminal device to determine to measure the inter-frequency.

Optionally, in some other embodiments, the eighth threshold is determined based on the RSRQ of the serving cell. The eighth threshold may be further determined based on the RSRQ of the serving cell and the mobility of the terminal device. Further, the eighth threshold is determined based on the RSRQ-based value of the serving cell of the terminal device. The RSRQ-based value of the serving cell of the terminal device may be Rsq, and Rsq is the RSRQ-based value of the serving cell of the terminal device. Rsq may be Rsq=$RSRQ_{meas,s}$+/− Qoffset, Rsq=$RSRQ_{meas,s}$+/− Qoffset−Qoffset$_{temp}$, Rsq=$RSRQ_{meas,s}$+$Q_{hyst}$, or $RSRQ_{meas,s}$+$Q_{hyst}$−Qoffset$_{temp}$, where Qoffset, $Q_{hyst}$, and Qoffset$_{temp}$ may be defined in the existing standard, and $RSRQ_{meas,s}$ is the RSRQ of the serving cell of the terminal device. For example, the eighth threshold is obtained by adding an offset to the RSRQ-based value of the serving cell of the terminal device. The offset may be greater than 0, less than 0, or equal to 0. The offset may be configured by the network device, predefined, or determined by the terminal device. The terminal device may determine the offset based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the offset. The terminal device determines the offset based on the mobility of the terminal device and the mapping relationship. That the terminal device determines the offset based on the mobility may further be specifically that the terminal device determines the offset based on the mobility and a first time length. The first time length may be the first period.

For another example, the eighth threshold is obtained by multiplying a scale factor by the RSRQ-based value of the serving cell of the terminal device. The scale factor may be greater than 1, less than 1, or equal to 1. The scale factor may be configured by the network device, predefined, or determined by the terminal device. When the scale factor is determined by the terminal device, the terminal device may determine the scale factor based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

Optionally, in some other embodiments, the eighth threshold is 0.

Optionally, in some embodiments, the ninth threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the ninth threshold. The terminal device determines the ninth threshold based on the mobility of the terminal device and the mapping relationship. That the terminal device determines the ninth threshold based on the mobility may further be specifically that the terminal device determines the ninth threshold based on the mobility and a first time length. The first time length may be the first period.

Optionally, in some other embodiments, the ninth threshold is determined based on the SINR of the serving cell. Further, the ninth threshold is determined based on the SINR-based value of the serving cell of the terminal device. The ninth threshold may be further determined based on the mobility of the terminal device and the SINR of the serving cell. For example, the ninth threshold is obtained by adding an offset to the SINR-based value of the serving cell of the terminal device. The offset may be greater than 0, less than 0, or equal to 0. The offset may be configured by the network device, predefined, or determined by the terminal device. The terminal device may determine the offset based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the offset. The terminal device determines the offset based on the mobility of the terminal device and the mapping relationship. That the terminal device determines the offset based on the mobility may further be specifically that the terminal device determines the offset based on the mobility and a first time length. The first time length may be the first period.

For another example, the ninth threshold is obtained by multiplying a scale factor by the SINR-based value of the serving cell of the terminal device. The scale factor may be greater than 1, less than 1, or equal to 1. The scale factor may be configured by the network device, predefined, or determined by the terminal device. When the scale factor is determined by the terminal device, the terminal device may determine the scale factor based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

Optionally, in some embodiments, the tenth threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the tenth threshold. The terminal device determines the tenth threshold based on the mobility of the terminal device and the mapping relationship. That the terminal device determines the tenth threshold based on the mobility may further be specifically that the terminal device determines the tenth threshold based on the mobility and a first time length. The first time length may be the first period.

Optionally, in some other embodiments, the tenth threshold is determined based on the threshold used by the terminal device to determine to measure the intra-frequency and/or the threshold used by the terminal device to determine to measure the inter-frequency. The tenth threshold may be further determined based on the mobility of the terminal device, and the threshold used by the terminal device to determine to measure the intra-frequency and/or the threshold used by the terminal device to determine to measure the inter-frequency.

For example, the tenth threshold is obtained by adding $((Q_{rxlevmin}+Q_{rxlevminoffset})+P_{compensation}+Qoffset_{temp})$ to the threshold $(S_{IntraSearchP})$ used by the terminal device to determine to measure the intra-frequency, or the tenth threshold is obtained by adding $((Q_{rxlevmin}+Q_{rxlevminoffset})+P_{compensation}+Qoffset_{temp})$ to the threshold $(S_{nonIntraSearchP})$ used by the terminal device to determine to measure the inter-frequency, or the tenth threshold is obtained by adding $((Q_{rxlevmin}+Q_{rxlevminoffset})+P_{compensation}+Qoffset_{temp})$ to a minimum value of the threshold $(S_{IntraSearchP})$ used by the terminal device to determine to measure the intra-frequency and the threshold $(S_{nonIntraSearchP})$ used by the terminal device to determine to measure the inter-frequency.

Optionally, in some other embodiments, the tenth threshold is determined based on the RSRP of the serving cell. The tenth threshold may be further determined based on the RSRP of the serving cell and the mobility of the terminal device. Further, the tenth threshold is determined based on the RSRP-based value of the serving cell of the terminal device. The RSRP-based value of the serving cell of the terminal device may be the RSRP of the serving cell of the terminal device. For example, the tenth threshold is obtained by adding an offset to the RSRP-based value of the serving cell of the terminal device. The offset may be greater than 0, less than 0, or equal to 0. The offset may be configured by the network device, predefined, or determined by the terminal device. The terminal device may determine the offset based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the offset. The terminal device determines the offset based on the mobility of the terminal device and the mapping relationship. That the terminal device determines the offset based on the mobility may further be specifically that the terminal device determines the offset based on the mobility and a first time length. The first time length may be the first period.

For another example, the tenth threshold is obtained by multiplying a scale factor by the RSRP-based value of the serving cell of the terminal device. The scale factor may be greater than 1, less than 1, or equal to 1. The scale factor may be configured by the network device, predefined, or determined by the terminal device. When the scale factor is determined by the terminal device, the terminal device may determine the scale factor based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

Optionally, in some other embodiments, the tenth threshold is obtained by adding an offset to a product of a scale factor and the RSRP-based value of the serving cell of the terminal device.

Optionally, in some embodiments, the eleventh threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the eleventh threshold. The terminal device determines the eleventh threshold based on the mobility of the terminal device and the mapping relationship. That the terminal device determines the eleventh threshold based on the mobility may further be specifically that the terminal device determines the eleventh threshold based on the mobility and a first time length. The first time length may be the first period.

Optionally, in some other embodiments, the eleventh threshold is determined based on the threshold used by the terminal device to determine to measure the intra-frequency and/or the threshold used by the terminal device to determine to measure the inter-frequency. The eleventh threshold may be further determined based on the mobility of the terminal device, and the threshold used by the terminal device to determine to measure the intra-frequency and/or the threshold used by the terminal device to determine to measure the inter-frequency.

For example, the eleventh threshold is obtained by adding $((Q_{qualmin}+Q_{qualminoffset})+Qoffset_{temp})$ to the threshold $(S_{IntraSearchP})$ used by the terminal device to determine to measure the intra-frequency, the eleventh threshold is obtained by adding $((Q_{qualmin}+Q_{qualminoffset})+Qoffset_{temp})$ to the threshold $(S_{nonIntraSearchP})$ used by the terminal device to determine to measure the inter-frequency, or the eleventh threshold is obtained by adding $((Q_{qualmin}+Q_{qualminoffset})+Qoffset_{temp})$ to the minimum value of the threshold $(S_{IntraSearchP})$ used by the terminal device to determine to measure the intra-frequency and the threshold $(S_{nonIntraSearchP})$ used by the terminal device to determine to measure the inter-frequency.

Optionally, in some other embodiments, the eleventh threshold is determined based on the RSRQ of the serving cell. The eleventh threshold may be further determined based on the RSRQ of the serving cell and the mobility of the terminal device. Further, the eleventh threshold is determined based on the RSRQ-based value of the serving cell of the terminal device. The RSRQ-based value of the serving cell of the terminal device may be the RSRQ of the serving cell of the terminal device. For example, the eleventh threshold is obtained by adding an offset to the RSRQ-based value of the serving cell of the terminal device. The offset may be greater than 0, less than 0, or equal to 0. The offset may be configured by the network device, predefined, or determined by the terminal device. The terminal device may determine the offset based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the offset. The terminal device determines the offset based on the mobility of the terminal device and the mapping relationship. That the terminal device determines the offset based on the mobility may further be specifically that the terminal device determines the offset based on the mobility and the first time length. The first time length may be the first period.

For another example, the eleventh threshold is obtained by multiplying a scale factor by the RSRQ-based value of the serving cell of the terminal device. The scale factor may be greater than 1, less than 1, or equal to 1. The scale factor may be configured by the network device, predefined, or determined by the terminal device. When the scale factor is determined by the terminal device, the terminal device may determine the scale factor based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and a first time length. The first time length may be the first period.

Optionally, in some other embodiments, the eleventh threshold is obtained by adding an offset to a product of a scale factor and the RSRQ-based value of the serving cell of the terminal device.

Optionally, in some embodiments, the twelfth threshold is determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the twelfth threshold. The terminal device determines the twelfth threshold based on the mobility of the terminal device and the mapping relationship. That the terminal device determines the twelfth threshold based on the mobility may further be specifically that the terminal device determines the twelfth threshold based on the mobility and a first time length. The first time length may be the first period.

Optionally, in some other embodiments, the twelfth threshold is determined based on the SINR of the serving cell. Further, the twelfth threshold is determined based on the SINR-based value of the serving cell of the terminal device. The twelfth threshold may be further determined based on the mobility of the terminal device and the SINR of the serving cell. For example, the twelfth threshold is obtained by adding an offset to the SINR-based value of the serving cell of the terminal device. The offset may be greater than 0, less than 0, or equal to 0. The offset may be configured by the network device, predefined, or determined by the terminal device. The terminal device may determine the offset based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the offset. The terminal device determines the offset based on the mobility of the terminal device and the mapping relationship. That the terminal device determines the offset based on the mobility may further be specifically that the terminal device determines the offset based on the mobility and a first time length. The first time length may be the first period.

For another example, the twelfth threshold is obtained by multiplying a scale factor by the SINR-based value of the serving cell of the terminal device. The scale factor may be greater than 1, less than 1, or equal to 1. The scale factor may be configured by the network device, predefined, or determined by the terminal device. When the scale factor is determined by the terminal device, the terminal device may determine the scale factor based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device may configure a mapping relationship between the mobility of the terminal device and the scale factor. The terminal device determines the scale factor based on the mobility of the terminal device and the mapping relationship. That the terminal device determines the scale factor based on the mobility may further be specifically that the terminal device determines the scale factor based on the mobility and the first time length. The first time length may be the first period.

Further, that the neighboring cell meets the cell selection criterion is that the neighboring cell meets the cell selection criterion S criterion.

It should be understood that the parameter Srxlev used in the cell selection criterion S is the SS-RSRP (or RSRP)- based value, and the parameter Squal used in the cell selection criterion S is the SS-RSRQ (or RSRQ)-based value. Therefore, after determining the SS-RSRP or the SS-RSRQ based on the at least one of the CRS, the SSB, the CSI-RS, and the DMRS, the terminal device can determine whether the neighboring cell meets the cell selection criterion.

Further, that the neighboring cell meets the cell reselection criterion may be understood as:

the terminal device may reselect the neighboring cell, or a sorting result of the neighboring cell is the best according to the cell reselection criterion defined in the existing standard, or a sorting result of the neighboring cell is better than that of the serving cell of the terminal device according to the cell reselection criterion defined in the existing standard.

It should be understood that parameters $R_s$ and $R_n$ in the cell reselection criterion R are SS-RSRP (or RSRP)-based values. Therefore, after determining the SS-RSRP based on the at least one of the CRS, the SSB, the CSI-RS, and the DMRS, the terminal device can determine whether the neighboring cell meets the cell reselection criterion.

Optionally, in some embodiments, the terminal device determines, for N times, that the neighboring cell meets the first preset condition, or the terminal device determines in a first time period, that the neighboring cell meets the first preset condition, where N is a positive integer.

Optionally, in some embodiments, N is configured by the network device. Further, the network device may configure N based on system information.

Optionally, in some other embodiments, N is predefined.

Optionally, in some embodiments, the first time period is X third periods, where X is a positive integer. Optionally, the third period may be the first period or the second period.

For example, when the terminal device determines, for N consecutive times, that the neighboring cell meets the first preset condition, the terminal device determines that the neighboring cell meets the first preset condition.

Alternatively, the terminal device determines, for M times, whether the neighboring cell meets the first preset condition. When the terminal device determines, for N times in the M times, that the neighboring cell meets the first preset condition, the terminal device determines that the neighboring cell meets the first preset condition, where M is a positive integer, and N is an integer greater than or equal to M/2 and less than or equal to M.

Alternatively, the terminal device determines, for M times, whether the neighboring cell meets the first preset condition. When the terminal device determines, for N times in the M times, that the neighboring cell meets the first preset condition, the terminal device determines that the neighboring cell meets the first preset condition, where M is a positive integer, and N is an integer greater than or equal to 1 and less than or equal to M.

It should be understood that a time interval between every two times of determining, by the terminal device, whether the cell meets the first preset condition may be the first period or the second period.

Alternatively, the terminal device determines in a first time period, that the neighboring cell meets the first preset condition. Duration of the first time period may be configured by the network device, or may be predefined.

Alternatively, that the terminal device determines, for a plurality of times in the first time period, whether the neighboring cell meets the first preset condition may be understood as that the terminal device determines, for a total of M times in the first time period, whether the neighboring cell meets the first preset condition, and determines, for N times in the M times that the neighboring cell meets the first preset condition, where M is a positive integer, and N is an integer greater than or equal to M/2 and less than or equal to M, or N is an integer greater than or equal to 1 and less than or equal to M.

Specifically, the first time period may be X third periods. That the terminal device determines, in the first time period, whether the neighboring cell meets the first preset condition may be that the terminal device determines, in each third period, whether the serving cell meets the first preset condition.

Further, when the terminal device determines, in at least one third period of the X third periods, that the neighboring cell meets the first preset condition, it may be considered that the terminal device determines, in the first time period, that the neighboring cell meets the first preset condition.

Alternatively, when the terminal device determines, in each third period of the X third periods, that the serving cell meets the first preset condition, it may be considered that the terminal device determines, in the first time period, that the serving cell meets the first preset condition.

Alternatively, when the terminal device determines, in Y third periods of the X third periods, that the serving cell meets the first preset condition, it may be considered that the terminal device determines, in the first time period, that the serving cell meets the first preset condition, where Y is an integer greater than or equal to X/2 and less than or equal to X, or Y is an integer greater than or equal to 1 and less than or equal to X.

It should be understood that, in each third period, the terminal device may determine, for one or more times, whether the neighboring cell meets the first preset condition.

When the terminal device determines, for one or more times in each third period, whether the neighboring cell meets the first preset condition, and the neighboring cell meets the first preset condition for P times, the terminal device determines that the neighboring cell meets the first preset condition in the third period, where P is a positive integer.

For example, the terminal device determines, for Q times in one third period, whether the neighboring cell meets the first preset condition. When the terminal device determines, for P times in the Q times that the neighboring cell meets the first preset condition, the terminal device determines that the neighboring cell meets the first preset condition in the third period, where Q is a positive integer, and P is an integer greater than or equal to Q/2 and less than or equal to Q.

Alternatively, the terminal device determines, for Q times in one third period, whether the neighboring cell meets the first preset condition. When the terminal device determines, for P times in the Q times that the neighboring cell meets the first preset condition, the terminal device determines that the neighboring cell meets the first preset condition in the third period, where Q is a positive integer, and P is an integer greater than or equal to 1 and less than or equal to Q.

Optionally, the terminal device may flexibly select different measurement periods for measuring or evaluating the cell based on whether the signal of the neighboring cell is stable, or the terminal device determines whether the signal is stable based on the change range of the RSRP, the RSRP-based value, the RSRQ, the RSRQ-based value, the SINR, or the SINR-based value to ensure that a result of determining whether the neighboring cell meets the first preset condition is determined when the signal of the neighboring cell is stable.

For example, when the change range of the RSRP or RSRQ-based value is less than or equal to the thirteenth threshold, and/or the change range of the RSRQ or the RSRQ-based value is less than or equal to the fourteenth threshold, it is considered that the signal is stable.

Determining that the change range of the RSRP or RSRP-based value is less than or equal to the thirteenth threshold includes:

a difference between a maximum value and a minimum value of the RSRP or the RSRP-based value is less than or equal to the thirteenth threshold, an absolute value of a difference between the RSRP and a first reference value is less than or equal to the thirteenth threshold, or an absolute value of a difference between the RSRP-based value and a second reference value is less than or equal to the thirteenth threshold.

Determining that the change range of the RSRQ or the RSRQ-based value is less than or equal to the fourteenth threshold includes:

a difference between a maximum value and a minimum value of the RSRQ or the RSRQ-based value is less than or equal to the fourteenth threshold; an absolute value of a difference between the RSRQ and a third reference value is less than or equal to the fourteenth threshold, or an absolute value of a difference between the RSRQ-based value and a fourth reference value is less than or equal to the fourteenth threshold.

Determining that the change range of the SINR or the SINR-based value is less than or equal to the fifteenth threshold includes:

a change range of a difference between a maximum value and a minimum value of the SINR or the SINR-based value is less than or equal to the fifteenth threshold;

an absolute value of a difference between the SINR and a fifth reference value is less than or equal to the fifteenth threshold, or an absolute value of a difference between the SINR-based value and a sixth reference value is less than or equal to the fifteenth threshold.

Determining that the absolute value of the difference between the RSRP and the first reference value is less than or equal to the thirteenth threshold may be that absolute values that are of differences between the RSRP of the neighboring cell and the first reference value and that are obtained by measuring a plurality of times are less than or equal to the thirteenth threshold, or may be at least one absolute value of the absolute values that are of the differences between the RSRP of the neighboring cell and the first reference value and that are obtained by measuring the plurality of times is less than or equal to the thirteenth threshold.

Determining that the absolute value of the difference between the RSRP-based value and the second reference value is less than or equal to the thirteenth threshold may be that absolute values that are of differences between the RSRP-based value and the second reference value and that are obtained by measuring a plurality of times are less than or equal to the thirteenth threshold, or may be at least one absolute value of the absolute values that are of the differences between the RSRP-based value and the second reference value and that are obtained by measuring the plurality of times is less than or equal to the thirteenth threshold.

Determining that the absolute value of the difference between the RSRQ and the third reference value is less than or equal to the fourteenth threshold may be that absolute values that are of differences between the RSRQ of the neighboring cell and the third reference value and that are obtained by measuring a plurality of times are less than or equal to the fourteenth threshold, or may be at least one absolute value of the absolute values that are of the differences between the RSRQ of the neighboring cell and the third reference value and that are obtained by measuring the plurality of times is less than or equal to the fourteenth threshold.

Determining that the absolute value of the difference between the RSRQ-based value and the fourth reference value is less than or equal to the fourteenth threshold may be that absolute values that are of differences between the RSRQ-based value and the fourth reference value and that are obtained by measuring a plurality of times are less than or equal to the fourteenth threshold, or may be at least one absolute value of the absolute values that are of the differences between the RSRQ-based value and the fourth reference value and that are obtained by measuring the plurality of times is less than or equal to the fourteenth threshold.

Determining that the absolute value of the difference between the SINR and the fifth reference value is less than or equal to the fifteenth threshold may be that absolute values that are of differences between the SINR of the neighboring cell and the fifth reference value and that are obtained by measuring a plurality of times are less than or equal to the fifteenth threshold, or may be at least one absolute value of the absolute values that are of the differences between the SINR of the neighboring cell and the fifth reference value and that are obtained by measuring the plurality of times is less than or equal to the fifteenth threshold.

Determining that the absolute value of the difference between the SINR-based value and the sixth reference value is less than or equal to the fifteenth threshold may be that absolute values that are of differences between the SINR-based value and the sixth reference value and that are obtained by measuring a plurality of times are less than or equal to the fifteenth threshold, or may be at least one absolute value of the absolute values that are of the differences between the SINR-based value and the sixth reference value and that are obtained by measuring the plurality of times is less than or equal to the fifteenth threshold.

For example, RSRP of the neighboring cell is separately measured as 1, 2, and 3 in three times, and it is assumed that the thirteenth threshold is 1. First, the difference between the maximum value and the minimum value of the RSRP of the neighboring cell is calculated as 2. In this case, the difference is greater than the value of the thirteenth threshold, which proves that the signal is not stable enough. It is further determined that the neighboring cell does not meet the third preset condition.

For another example, RSRP of the neighboring cell is separately measured as 1, 2, and 3 in three times, the first reference value is 2, and it is assumed that the thirteenth threshold is 1.

First, the absolute values of the differences between the RSRP and the first reference value are respectively calculated as 1, 0, and 1. In this case, the absolute values of the differences between the RSRP and the first reference value are all less than or equal to the thirteenth threshold, which proves that the signal is stable.

Alternatively, assuming that the thirteenth threshold is 0, only one absolute value of the absolute values of the differences between the RSRP and the first reference value is less than or equal to the thirteenth threshold, which may also prove that the signal is stable.

For another example, the RSRP of the neighboring cell is measured as 1, the first reference value is 2, and it is assumed that the thirteenth threshold is 1. First, the absolute value of the difference between the RSRP and the first reference value is calculated as 1. In this case, the absolute value of the difference between the RSRP and the first reference value is less than or equal to the thirteenth threshold, which proves that the signal is stable.

Whether the neighboring cell meets the first preset condition is determined based on the foregoing determining method.

Determining that the change range of the RSRQ or the RSRQ-based value is less than or equal to the fourteenth threshold, determining that the change range of the SINR or the SINR-based value is less than or equal to the fifteenth threshold, and determining that the change range of the RSRP-based value is less than or equal to the thirteenth threshold are similar to the foregoing determining that the change range of the value of the RSRP is less than or equal to the thirteenth threshold. Examples are not described herein again.

The thirteenth threshold, the fourteenth threshold, and the fifteenth threshold may be configured by the network device, may be predefined, or may be determined by the terminal.

Optionally, in some embodiments, the thirteenth threshold, the fourteenth threshold, and the fifteenth threshold are determined by the terminal device based on the mobility of the terminal device. The mobility of the terminal device may include at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state. The network device can configure a mapping relationship between the mobility of the terminal device and the first threshold. The terminal device determines the first threshold based on the mobility of the terminal device and the mapping relationship. That the terminal device determines the first threshold based on the mobility may further be specifically that the terminal device determines the first threshold based on the mobility and a first time length. The first time length may be the first period.

After determining the first threshold, the terminal device can determine whether the cell meets the first preset condition.

If the terminal device determines that the cell meets the first preset condition, the operation S110 is performed, or if the terminal device determines that the cell does not meet the first preset condition, operation S120 is performed.

Further, measuring the cell may be measuring the measurement quantity of the cell, and evaluating the cell may be evaluating the cell selection criterion or the cell reselection criterion. In this application, the cell measurement method includes measuring the measurement quantity of the cell and evaluating whether the cell meets the cell selection criterion or the cell reselection criterion.

It should be understood that the terminal device uses the first period as the period for measuring or evaluating the cell may be understood as that the terminal device measures or evaluates the cell in at least each first period.

S120: If determining that the cell does not meet the first preset condition, the terminal device uses a second period as a period for measuring or evaluating the cell.

The first period is different from the second period. In other words, the terminal device measures or evaluates the cell by using different measurement or evaluation periods based on different cell statuses.

Specifically, the first period is greater than the second period. In other words, when the cell meets the first preset condition, the measurement period for measuring the to-be-measured cell by the terminal device is greater than the measurement period for measuring the cell that does not meet the first preset condition.

It should be understood that a longer cell measurement period for the terminal device indicates a lower measurement frequency for the terminal device. Therefore, power consumption of the terminal device is reduced.

For example, when the cell is the serving cell of the terminal device, and if the measurement quantity of the cell meets the second preset condition, the terminal device does not measure the neighboring cell, the cell meets the cell selection criterion, or the cell meets the cell reselection criterion, it indicates that the signal quality of the cell is comparatively good, and there is a low probability that the terminal device reselects a cell. In this case, the terminal device uses the first period as the period for measuring or evaluating the cell, and the terminal device measures or evaluates the cell at a low frequency. Therefore, the power consumption of the terminal device can be reduced.

When the cell is the neighboring cell of the terminal device, and if the measurement quantity of the cell meets the third preset condition, the cell does not meet the cell selection criterion, or the cell does not meet the cell reselection criterion, it indicates that the signal quality of the cell is poor, and there is a low probability that the terminal device reselects the cell. In this case, the terminal device uses the first period as the period for measuring or evaluating the cell, and the terminal device measures or evaluates the cell at a low frequency. Therefore, the power consumption of the terminal device can be reduced.

Optionally, in some embodiments, the first period is greater than the second period, and the first period may be an integer multiple of the second period. Optionally, the multiple value varies with different second period values.

Optionally, the second period may be a DRX cycle used by the terminal device, or may be an integer multiple of a DRX cycle used by the terminal device.

Optionally, if the cell is the serving cell of the terminal device, the second period may be the DRX cycle. If the cell is the neighboring cell of the terminal device, the second period may be the integer multiple of the DRX cycle.

It should be understood that the first period, the second period, and the third period may be configured by the network device, or the first period, the second period, and the third period may be predefined. Optionally, the network device may configure the first period, the second period, and the third period based on the system information.

For example, when the first period is configured by the network device, refer to the following two configuration methods.

(1) The first period is a quantity of time units, and the time unit may be a frame, a subframe, a timeslot, a second, a millisecond, or the like.

CellMeasCycle ENUMERATED . . . (rf 32, rf 64, rf 128, rf 256), where

CellMeasCycle indicates the first period, rf 32 indicates 32 radio frames, rf 64 indicates 64 radio frames, and so on.

(2) The first period is a multiple of the second period.

Parameters configured by the network device may be:

CellMeasCycle . . . ENUMERATED (2, 4, 8), where

CellMeasCycle indicates the first period, 2 indicates that the first period is twice the second period, 4 indicates that the first period is four times longer than the second period, and 8 indicates that the first period is eight times longer than the second period.

It should be further understood that, in this embodiment of this application, whether the terminal device is in an idle mode, an inactive mode, or a radio resource control connection (radio resource control connected, RRC_CONNECTED) mode is not limited.

It should be understood that the terminal device uses the second period as the period for measuring or evaluating the cell may be understood as that the terminal device measures or evaluates the cell in at least each second period.

Optionally, the terminal device may use the second period when initially measuring or evaluating the cell.

Optionally, in some embodiments, the first reference value may be the RSRP that is of the cell and that is measured by the terminal device before the terminal device determines, in first measurement time/first measurement time in N times, that the cell meets or does not meet the first preset condition.

Optionally, in some other embodiments, the first reference value may be the RSRP that is of the cell and that is measured by terminal device before the terminal device determines, in first measurement time/first measurement time in the first time period, that the cell meets or does not meet the first preset condition.

Optionally, in some other embodiments, the first reference value may be the RSRP that is of the cell and that is measured by terminal device before the terminal device determines, in first measurement time/first measurement time in M times, that the cell meets or does not meet the first preset condition.

Optionally, in some embodiments, the second reference value may be an RSRP value that is of the cell and that is measured by terminal device based on that the terminal device determines in first measurement time/first measurement time in N times, that the cell meets or does not meet the first preset condition.

Optionally, in some other embodiments, the second reference value may be an RSRP value that is of the cell and that is measured by terminal device based on that the terminal device determines, in first measurement time/first measurement time in the first time period, that the cell meets or does not meet the first preset condition.

Optionally, in some other embodiments, the second reference value may be an RSRP value that is of the cell and that is measured by terminal device based on that the terminal device determines, in first measurement time/first measurement time in M times, that the cell meets or does not meet the first preset condition.

Optionally, in some embodiments, the third reference value may be the RSRQ that is of the cell and that is measured by the terminal device before the terminal device determines, in first measurement time/first measurement time in N times, that the cell meets or does not meet the first preset condition.

Optionally, in some other embodiments, the third reference value may be the RSRQ that is of the cell and that is measured by the terminal device before the terminal device determines, in first measurement time/first measurement time in the first time period, that the cell meets or does not meet the first preset condition.

Optionally, in some other embodiments, the third reference value may be the RSRQ that is of the cell and that is measured by the terminal device before the terminal device determines in first measurement time/first measurement time in M times, that the cell meets or does not meet the first preset condition.

Optionally, in some embodiments, the fourth reference value may be a value of the RSRQ that is of the cell and that is measured by the terminal device based on that the terminal device determines in first measurement time/first measurement time in N times, that the cell meets or does not meet the first preset condition.

Optionally, in some other embodiments, the fourth reference value may be a value of the RSRQ that is of the cell and that is measured by the terminal device based on that the terminal device determines, in first measurement time/first measurement time in the first time period, that the cell meets or does not meet the first preset condition.

Optionally, in some other embodiments, the fourth reference value may be a value of the RSRQ that is of the cell and that is measured by the terminal device based on that the terminal device determines, in first measurement/first measurement time in M times, that the cell meets or does not meet the first preset condition.

Optionally, in some embodiments, the fifth reference value may be the SINR that is of the cell and that is measured by the terminal device before the terminal device determines, in first measurement time/first measurement time in N times, that the cell meets or does not meet the first preset condition.

Optionally, in some other embodiments, the fifth reference value may be the SINR that is of the cell and that is obtained by the terminal device through measurement before the terminal device determines, the first measurement/first measurement time in the first time period, that the cell meets or does not meet the first preset condition.

Optionally, in some other embodiments, the fifth reference value may be the SINR that is of the cell and that is measured by the terminal device before the terminal device determines in first measurement time/first measurement time in M times, that the cell meets or does not meet the first preset condition.

Optionally, in some embodiments, the sixth reference value may be a value of the SINR that is of the cell and that is measured by the terminal device based on that the terminal device determines in first measurement time/first measurement time in N times, that the cell meets or does not meet the first preset condition.

Optionally, in some other embodiments, the sixth reference value may be a value of the SINR that is of the cell and that is measured by the terminal device based on that the terminal device determines, in first measurement time/first measurement time in the first time period, that the cell meets or does not meet the first preset condition.

Optionally, in some other embodiments, the sixth reference value may be a value of the SINR that is of the cell and that is measured by the terminal device based on that the terminal device determines, in first measurement time/first measurement time in M times, that the cell meets or does not meet the first preset condition.

Optionally, in some embodiments, the first reference value, the second reference value, the third reference value, the fourth reference value, the fifth reference value, and the sixth reference value may be configured by the network device.

Optionally, in some other embodiments, the first reference value, the second reference value, the third reference value, the fourth reference value, the fifth reference value, and the sixth reference value may be predefined.

The names such as the RSRP and the RSRQ are all names defined for ease of differentiation, and shall not constitute any limitation on this application. This application does not exclude a possibility of replacing the foregoing names with other names in an existing or future protocol.

FIG. 3 to FIG. 6 are schematic diagrams of periods for measuring a cell by a terminal device according to this application.

Figure 3:
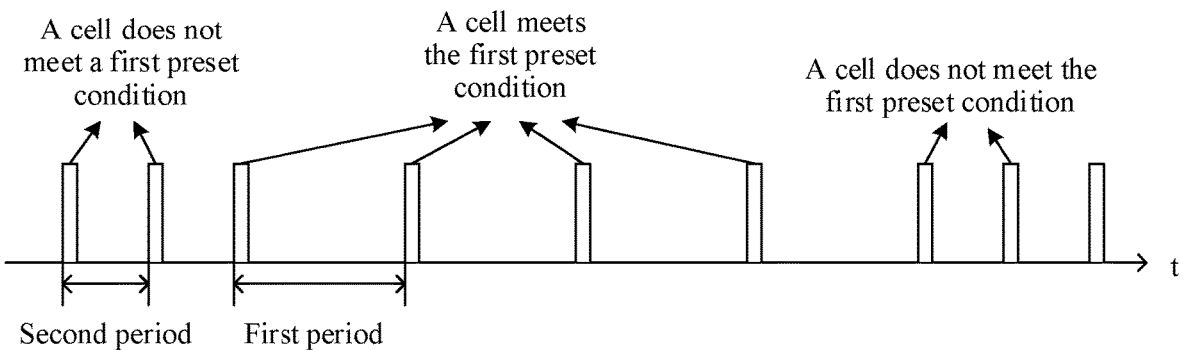
FIG. 3 is a schematic diagram of a measurement or evaluation period for measuring a cell by a terminal device.

FIG. 3 is a schematic diagram of a measurement or evaluation period for measuring a cell by a terminal device.

It can be seen from FIG. 3 that when the cell does not meet a first preset condition, the terminal device measures or evaluates the cell by using a second period. When the cell meets the first preset condition, the terminal device measures or evaluates the cell by using a first period.

Figure 4:
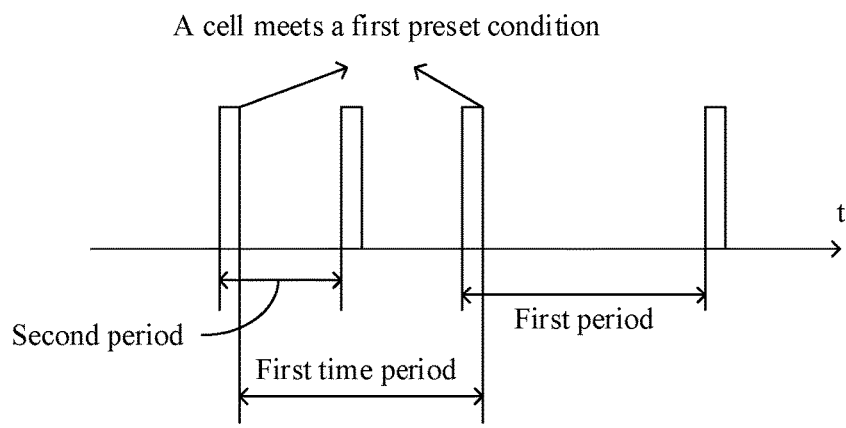
FIG. 4 is another schematic diagram of a measurement or evaluation period for measuring a cell by a terminal device.

FIG. 4 is another schematic diagram of a measurement or evaluation period for measuring a cell by a terminal device.

It can be seen from FIG. 4 that the terminal device measures or evaluate the cell by using a second period in a start phase of a time axis.

In a process in which the terminal device measures or evaluates the cell by using the second period, when determining that the cell meets a first preset condition in a first time period, the terminal device measures or evaluates the cell by using a first period. In other words, in the process in which the terminal device measures the cell by using the second period, after the terminal device determines that the cell meets the first preset condition, the terminal device no longer measures or evaluates the cell by using the second period. The terminal device changes the cell measurement or evaluation period to the first period.

Figure 5:
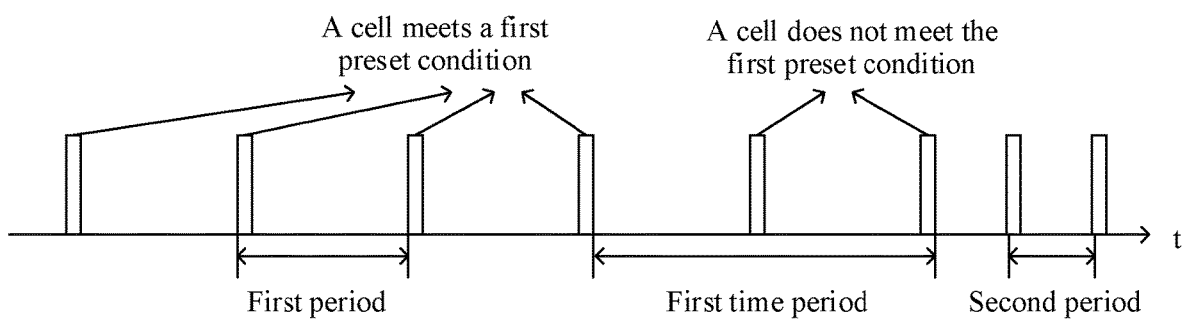
FIG. 5 is another schematic diagram of a measurement or evaluation period for measuring a cell by a terminal device.

FIG. 5 is a schematic diagram of a measurement or evaluation period for measuring a cell by a terminal device.

It can be seen from FIG. 5 that the terminal device measures or evaluate the cell by using a first period in a start phase of a time axis.

In a process in which the terminal device measures or evaluates the cell by using the first period, when determining that the cell does not meet a first preset condition in a first time period, the terminal device measures and evaluates the cell by using a second period. In other words, in the process in which the terminal device measures or evaluates the cell by using the first period, after the terminal device determines that the cell does not meet the first preset condition, the terminal device no longer measures or evaluates the cell by using the first period. The terminal device changes the measurement or evaluation period to the second period.

Figure 6:
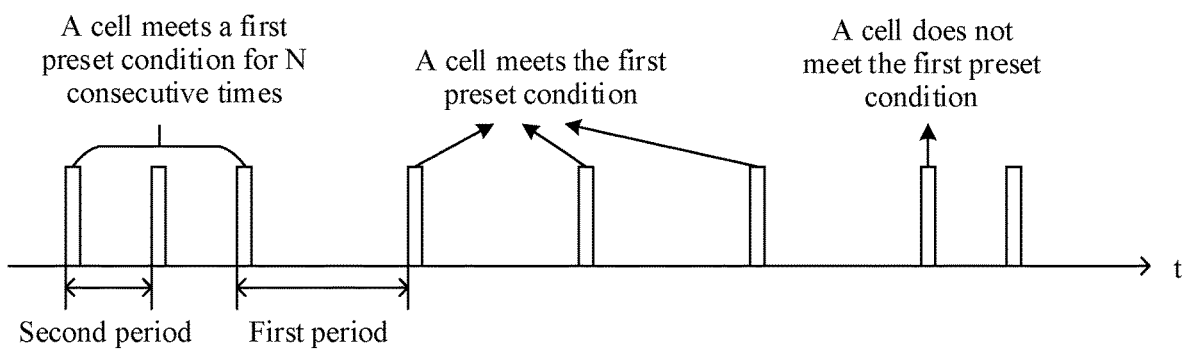
FIG. 6 is another schematic diagram of a measurement or evaluation period for measuring a cell by terminal device.

FIG. 6 is a schematic diagram of a measurement or evaluation period for measuring a cell by a terminal device.

It can be seen from FIG. 6 that whether the cell meets a first preset condition may be determined for N consecutive times. The terminal device measures or evaluate the cell by using a second period in a start phase of a time axis. In a process in which the terminal device measures or evaluates the cell by using the second period, when determining that the cell meets the first preset condition for the N consecutive times, the terminal device measures or evaluates the cell by using a first period. In other words, in the process in which the terminal device measures or evaluates the cell by using the second period, after the terminal device determines that the cell meets the first preset condition, the terminal device no longer measures or evaluates the cell by using the second period. The terminal device changes the measurement or evaluation period to the first period.

Figure 7:
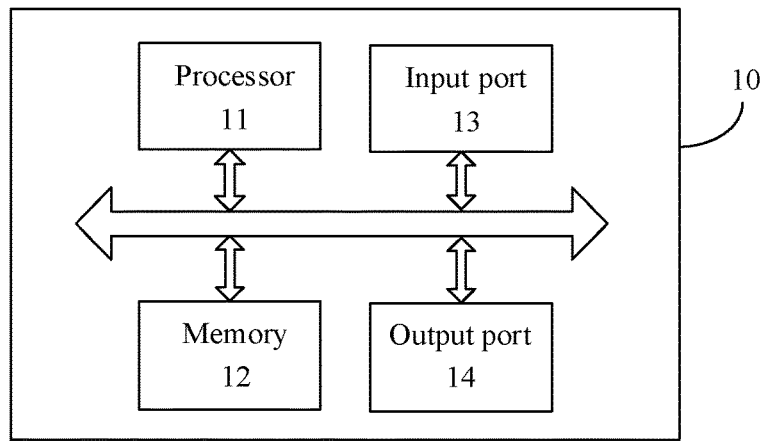
FIG. 7 is a schematic diagram of a cell measurement terminal device 10 according to an embodiment of this application.

FIG. 7 is a schematic diagram of a cell measurement device 10 according to an embodiment of this application. As shown in FIG. 7, the cell measurement device may be a terminal device, or may be a chip or a circuit, for example, a chip or a circuit that may be disposed in a terminal device. The terminal device corresponds to the terminal device in the foregoing method.

The communications apparatus 10 may include a processor 11 and a memory 12. The memory 12 is configured to store an instruction, and the processor 11 is configured to execute the instruction stored in the memory 12, so that the apparatus 20 implements the operations performed by the terminal device in the method corresponding to FIG. 3 to FIG. 6.

For example, the processor 11 may determine whether a cell meets a first preset condition, and measure or evaluate the cell by using a first period or a second period.

For another example, the processor 11 may determine a measurement quantity of the cell.

The communications apparatus 10 may further include an input port 13 and an output port 14.

Further, the processor 11, the memory 12, the input port 13, and the output port 14 may communicate with each other through an internal connection path, to transfer a control signal and/or a data signal. The memory 12 is configured to store a computer program.

The processor 11 may be configured to invoke the computer program from the memory 12 and run the computer program, to control the input port 13 to receive a signal and control the output port 14 to send a signal, to complete the operations of the terminal device in the foregoing method. The memory 12 may be integrated into the processor 11, or may be separated from the processor 11.

Optionally, if the communications apparatus 10 is the terminal device, the input port 13 is a receiver, and the output port 14 is a transmitter. The receiver and the transmitter may be a same physical entity or different physical entities. If being the same physical entity, the receiver and the transmitter may be collectively referred to as a transceiver.

Optionally, if the communications apparatus 10 is the chip or the circuit, the input port 13 is an input interface and the output port 14 is an output interface.

In an implementation, functions of the input port 13 and the output port 14 may be implemented by using a transceiver circuit or a dedicated transceiver chip. The processor 11 may be implemented by using a dedicated processing chip, a processing circuit, a processor, or a general-purpose chip.

In another implementation, it may be considered to implement the terminal device provided in this embodiment of this application by using a general-purpose computer. To be specific, program code for implementing functions of the processor 11, the input port 13, and the output port 14 is stored in the memory 12, and a general-purpose processor executes the code in the memory 12 to implement the functions of the processor 11, the input port 13, and the output port 14.

For concepts, explanations, and detailed descriptions used by the apparatus 10 and related to the technical solutions provided in the embodiments of this application and other operations, refer to the descriptions of the content in the foregoing method or other embodiments. Details are not described herein again.

Figure 8:
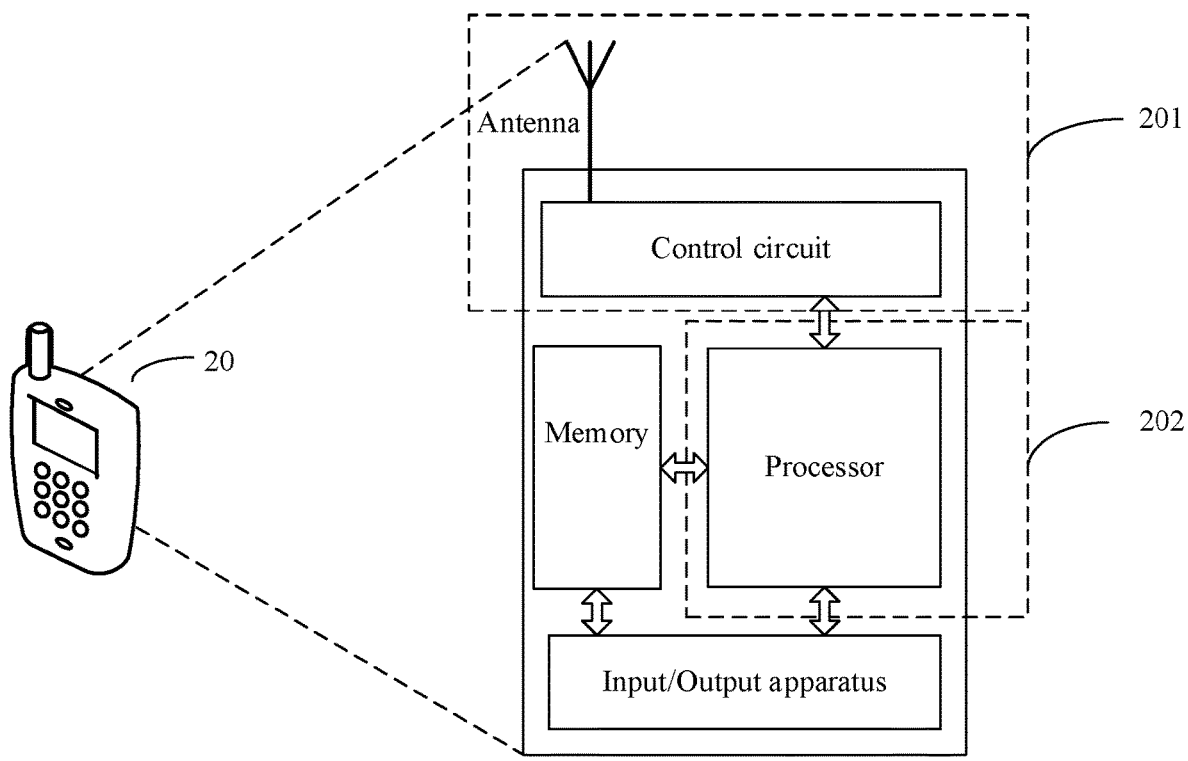
FIG. 8 is a schematic diagram of a structure of a terminal device 20 according to this application.

FIG. 8 is a schematic diagram of a structure of a terminal device 20 according to this application. For ease of description, FIG. 8 shows only main components of the terminal device. As shown in FIG. 8, the terminal device 20 includes a processor, a memory, a control circuit, an antenna, and an input/output apparatus.

The processor is mainly configured to process a communications protocol and communication data, control the entire terminal device, execute a software program, and process data of the software program, for example, configured to support the terminal device in performing the action described in the foregoing embodiments of the method for transmitting the indication of the precoding matrix. The memory is mainly configured to store a software program and data, for example, store a codebook described in the foregoing embodiments. The control circuit is mainly configured to perform conversion between a baseband signal and a radio frequency signal, and process the radio frequency signal. A combination of the control circuit and the antenna may also be referred to as a transceiver that is mainly configured to receive and transmit a radio frequency signal in an electromagnetic wave form. The input/output apparatus, such as a touchscreen, a display screen, or a keyboard, is mainly configured to receive data entered by a user and output data to the user.

After the terminal device is powered on, the processor may read the software program in a storage unit, explain and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal through the antenna in the electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 8 shows only one memory and one processor. Actually, the terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communications protocol and communication data. The central processing unit is mainly configured to control the entire terminal device, execute a software program, and process data of the software program. The processor in FIG. 8 integrates functions of the baseband processor and the central processing unit. A person skilled in the art may understand that the baseband processor and the central processing unit may be processors independent of each other, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a software program form. The processor executes the software program, to implement a baseband processing function.

For example, in this embodiment of this application, the antenna having a transceiver function and the control circuit may be considered as a transceiver unit 201 of the terminal device 20, and the processor having a processing function may be considered as a processing unit 202 of the terminal device 20.

As shown in FIG. 8, the terminal device 20 includes the transceiver unit 201 and the processing unit 202. The transceiver unit may also be referred to as a transceiver, a transceiver machine, a transceiver apparatus, or the like. Optionally, a component that is in the transceiver unit 201 and that is configured to implement a receiving function may be considered as a receiving unit, and a component that is in the transceiver unit 201 and that is configured to implement a sending function may be considered as a sending unit. In other words, the transceiver unit 201 includes the receiving unit and the sending unit. For example, the receiving unit may also be referred to as a receiver machine, a receiver, a receiver circuit, or the like, and the sending unit may be referred to as a transmitter, a transmitter, a transmit circuit, or the like.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the unit is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A cell measurement method, comprising:
    determining, by a terminal device, whether a cell meets a first preset condition, wherein the first preset condition varies based on a relationship between the cell and the terminal device, wherein when the cell is a serving cell of the terminal device, the first preset condition comprises at least one of a measurement quantity of the cell meeting a second preset condition, the terminal device not measuring a neighboring cell, the cell meeting a cell selection criterion, or the cell meeting a cell reselection criterion, or when the cell is a neighboring cell of the terminal device, the first preset condition comprises at least one of a measurement quantity of the cell meeting a third preset condition, the cell not meeting a cell selection criterion, or the cell not meeting a cell reselection criterion;
    measuring or evaluating, by the terminal device, the cell using a first period or a second period based on whether the cell meets the first preset condition, including using the first period for measuring or evaluating the cell when the cell meets the first preset condition, or using the second period for measuring or evaluating the cell when the cell does not meet the first preset condition, wherein the first period is greater than the second period.

2. The method according to claim 1,
    wherein the measurement quantity of the cell comprises: at least one of reference signal received power (RSRP) of the cell, an RSRP-based value, reference signal received quality RSRQ of the cell, an RSRQ-based value, a ratio SINR of power of a signal sent by the serving cell to a sum of interference and noise power, and an SINR-based value;
    wherein the second preset condition comprises: at least one of the RSRP-based value is greater than or equal to a first threshold, the RSRQ-based value is greater than or equal to a second threshold, the SINR-based value is greater than or equal to a third threshold, the RSRP is greater than or equal to a fourth threshold, the RSRQ is greater than or equal to a fifth threshold, and the SINR is greater than or equal to a sixth threshold.

3. The method according to claim 2, wherein the RSRP-based value is Srxlev used in the cell selection criterion, or the RSRQ-based value is Squal used in the cell selection criterion.

4. The method according to claim 2, wherein at least one of the first threshold, the second threshold, the third threshold, the fourth threshold, the fifth threshold, and the sixth threshold is determined based on mobility of the terminal device.

5. The method according to claim 4, wherein the mobility of the terminal device comprises at least one of a moving speed of the terminal device, the terminal device being static, the terminal device being moving, the terminal device being at a low speed, the terminal device being at a medium speed, the terminal device being at a high speed, the terminal device being in a normal mobility state, the terminal device being in a medium mobility state, and the terminal device being in a high mobility state.

6. The method according to claim 2, wherein the at least one of the first threshold, the second threshold, the third threshold, the fourth threshold, the fifth threshold, and the sixth threshold is determined based on a target threshold, and the target threshold is a threshold used by the terminal device to determine to measure an intra-frequency and/or a threshold used by the terminal device to determine to measure an inter-frequency;
    wherein the first threshold is obtained by adding a first offset to the threshold used by the terminal device to determine to measure the intra-frequency;
    the first threshold is obtained by adding a second offset to the threshold used by the terminal device to determine to measure the inter-frequency; or
    the first threshold is obtained by adding a third offset to a maximum value of the threshold used by the terminal device to determine to measure the intra-frequency and the threshold used by the terminal device to determine to measure the inter-frequency.

7. The method according to claim 6, wherein the second threshold is obtained by adding a fourth offset to the threshold used by the terminal device to determine to measure the intra-frequency;
    the first threshold is obtained by adding a fifth offset to the threshold used by the terminal device to determine to measure the inter-frequency; or
    the first threshold is obtained by adding a sixth offset to the maximum value of the threshold used by the terminal device to determine to measure the intra-frequency and the threshold used by the terminal device to determine to measure the inter-frequency.

8. The method according to claim 2, wherein the third preset condition comprises:
    at least one of the RSRP-based value is less than or equal to a seventh threshold, the RSRQ-based value is less than or equal to an eighth threshold, the SINR-based value is less than or equal to a ninth threshold, the RSRP is less than or equal to a tenth threshold, the RSRQ is less than or equal to an eleventh threshold, and the SINR is less than or equal to a twelfth threshold; wherein the RSRP-based value is Rn used in the cell reselection criterion.

9. The method according to claim 8, wherein at least one of the seventh threshold, the eighth threshold, the ninth threshold, the tenth threshold, the eleventh threshold, and the twelfth threshold is determined based on mobility of the terminal device.

10. The method according to claim 8, wherein the at least one of the seventh threshold, the eighth threshold, the ninth threshold, the tenth threshold, the eleventh threshold, and the twelfth threshold is determined based on the measurement quantity of the serving cell of the terminal device, wherein the seventh threshold is obtained by adding a seventh offset to Rs used in the cell reselection criterion.

11. The method according to claim 8, wherein the second preset condition comprises:
at least one of a change range of the RSRP or the RSRP-based value is less than or equal to a thirteenth threshold, a change range of the RSRQ or the RSRQ-based value is less than or equal to a fourteenth threshold, and a change range of the SINK or the SINK-based value is less than or equal to a fifteenth threshold; or
the third preset condition comprises:
at least one of a change range of the RSRP or the RSRP-based value is less than or equal to a thirteenth threshold, a change range of the RSRQ or the RSRQ-based value is less than or equal to a fourteenth threshold, and a change range of the SINR or the SINR-based value is less than or equal to the fifteenth threshold;
wherein that a change range of the RSRP or the RSRP-based value is less than or equal to a thirteenth threshold comprises:
a difference between a maximum value and a minimum value of the RSRP or the RSRP-based value is less than or equal to the thirteenth threshold; or
an absolute value of a difference between the RSRP and a first reference value is less than or equal to the thirteenth threshold, or an absolute value of a difference between the RSRP-based value and a second reference value is less than or equal to the thirteenth threshold;
that a change range of the RSRQ or the RSRQ-based value is less than or equal to a fourteenth threshold comprises:
a change range of a difference between a maximum value and a minimum value of the RSRQ or the RSRQ-based value is less than or equal to the fourteenth threshold; or
an absolute value of a difference between the RSRQ and a third reference value is less than or equal to the fourteenth threshold, or an absolute value of a difference between the RSRQ-based value and a fourth reference value is less than or equal to the fourteenth threshold; and
that a change range of the SINR or the SINR-based value is less than or equal to a fifteenth threshold comprises:
a change range of a difference between a maximum value and a minimum value of the SINR or the SINR-based value is less than or equal to the fifteenth threshold; or
an absolute value of a difference between the SINR and a fifth reference value is less than or equal to the fifteenth threshold, or an absolute value of a difference between the SINR-based value and a sixth reference value is less than or equal to the fifteenth threshold;
wherein at least one of the thirteenth threshold, the fourteenth threshold, and the fifteenth threshold is determined based on mobility of the terminal device.

12. A communications apparatus, comprising:
a processor; and
a memory coupled to the processor and storing program instructions, which, when executed, cause the processor to perform operations comprising:
determining whether a cell meets a first preset condition, wherein when the cell is a serving cell of the communications apparatus, the first preset condition comprises at least one of a measurement quantity of the cell meeting a second preset condition, the communications apparatus not measuring a neighboring cell, the cell meeting a cell selection criterion, or the cell meeting a cell reselection criterion, or when the cell is a neighboring cell of the communications apparatus, the first preset condition comprises at least one of a measurement quantity of the cell meeting a third preset condition, the cell not meeting a cell selection criterion, or the cell not meeting a cell reselection criterion;
measuring or evaluating the cell using a first period or a second period based on whether the cell meets the first preset condition, including using the first period for measuring or evaluating the cell when the cell meets the first preset condition, or using the second period for measuring or evaluating the cell when the cell does not meet the first preset condition, wherein the first period is greater than the second period.

13. The communications apparatus according to claim 12, wherein the communications apparatus is a terminal device, a chip, or a circuit.

14. The communications apparatus according to claim 12, wherein the measurement quantity of the cell comprises:
at least one of reference signal received power (RSRP) of the cell, an RSRP-based value, reference signal received quality RSRQ of the cell, an RSRQ-based value, a ratio SINK of power of a signal sent by the serving cell to a sum of interference and noise power, and an SINR-based value; wherein the second preset condition comprises:
at least one of the RSRP-based value is greater than or equal to a first threshold, the RSRQ-based value is greater than or equal to a second threshold, the SINR-based value is greater than or equal to a third threshold, the RSRP is greater than or equal to a fourth threshold, the RSRQ is greater than or equal to a fifth threshold, and the SINR is greater than or equal to a sixth threshold; and
wherein the RSRP-based value is Srxlev used in the cell selection criterion, or the RSRQ-based value is Squal used in the cell selection criterion.

15. The communications apparatus according to claim 14, wherein at least one of the first threshold, the second threshold, the third threshold, the fourth threshold, the fifth threshold, and the sixth threshold is determined based on mobility of the communications apparatus.

16. The communications apparatus according to claim 14, wherein the at least one of the first threshold, the second threshold, the third threshold, the fourth threshold, the fifth threshold, and the sixth threshold is determined based on a target threshold, and the target threshold is a threshold used by the communications apparatus to determine to measure an intra-frequency and/or a threshold used by the communications apparatus to determine to measure an inter-frequency; wherein the first threshold is obtained by adding a first offset to the threshold used by the communications apparatus to determine to measure the intra-frequency;
the first threshold is obtained by adding a second offset to the threshold used by the communications apparatus to determine to measure the inter-frequency; or
the first threshold is obtained by adding a third offset to a maximum value of the threshold used by the communications apparatus to determine to measure the intra-frequency and the threshold used by the communications apparatus to determine to measure the inter-frequency.

17. The communications apparatus according to claim 14, wherein the second threshold is obtained by adding a fourth offset to a threshold used by the communications apparatus to determine to measure an intra-frequency;

the first threshold is obtained by adding a fifth offset to the threshold used by the communications apparatus to determine to measure an inter-frequency; or the first threshold is obtained by adding a sixth offset to a maximum value of the threshold used by the communications apparatus to determine to measure the intra-frequency and the threshold used by the communications apparatus to determine to measure the inter-frequency.

18. The communications apparatus according to claim 14, wherein the third preset condition comprises:

at least one of the RSRP-based value is less than or equal to a seventh threshold, the RSRQ-based value is less than or equal to an eighth threshold, the SINR-based value is less than or equal to a ninth threshold, the RSRP is less than or equal to a tenth threshold, the RSRQ is less than or equal to an eleventh threshold, and the SINR is less than or equal to a twelfth threshold; wherein the RSRP-based value is Rn used in the cell reselection criterion.

19. The communications apparatus according to claim 18, wherein the at least one of the seventh threshold, the eighth threshold, the ninth threshold, the tenth threshold, the eleventh threshold, and the twelfth threshold is determined based on the measurement quantity of the serving cell of the terminal device, wherein the seventh threshold is obtained by adding a seventh offset to Rs used in the cell reselection criterion.

20. A non-transitory computer-readable storage medium, wherein the computer-readable storage medium stores a program, and the program causes a communications apparatus to perform operations:

determining, by a terminal device, whether a cell meets a first preset condition, wherein when the cell is a serving cell of the terminal device, the first preset condition comprises at least one of a measurement quantity of the cell meeting a second preset condition, the terminal device not measuring a neighboring cell, the cell meeting a cell selection criterion, or the cell meeting a cell reselection criterion, or when the cell is a neighboring cell of the terminal device, the first preset condition comprises at least one of a measurement quantity of the cell meeting a third preset condition, the cell not meeting a cell selection criterion, or the cell not meeting a cell reselection criterion;

measuring or evaluating, by the terminal device, the cell using a first period or a second period based on whether the cell meets the first preset condition, including using the first period for measuring or evaluating the cell when the cell meets the first preset condition, or using the second period for measuring or evaluating the cell when the cell does not meet the first preset condition, wherein the first period is greater than the second period.

* * * * *

UNITED STATES PATENT AND TRADEMARK OFFICE
CERTIFICATE OF CORRECTION

PATENT NO. : 11,496,935 B2
APPLICATION NO. : 16/973357
DATED : November 8, 2022
INVENTOR(S) : Yu Cai, Yanzhao He and Jian Wang It is certified that error appears in the above-identified patent and that said Letters Patent is hereby corrected as shown below:

In the Claims

In Claim 11, Column 57, Line 12, delete "SINK" and insert --SINR--.

In Claim 11, Column 57, Line 13, delete "SINK" and insert --SINR--.

In Claim 14, Column 58, Line 28, delete "SINK" and insert --SINR--.

Signed and Sealed this
Seventh Day of February, 2023

Katherine Kelly Vidal
*Director of the United States Patent and Trademark Office*